United States Patent
Hara et al.

(10) Patent No.: US 7,317,498 B2
(45) Date of Patent: Jan. 8, 2008

(54) VIEWING ANGLE MAGNIFICATION LIQUID CRYSTAL DISPLAY UNIT

(75) Inventors: Kazutaka Hara, Ibaraki (JP); Naoki Takahashi, Ibaraki (JP); Minoru Miyatake, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 430 days.

(21) Appl. No.: 10/512,050

(22) PCT Filed: Apr. 18, 2003

(86) PCT No.: PCT/JP03/04944

§ 371 (c)(1),
(2), (4) Date: Oct. 21, 2004

(87) PCT Pub. No.: WO03/091792

PCT Pub. Date: Nov. 6, 2003

(65) Prior Publication Data

US 2005/0200776 A1    Sep. 15, 2005

(30) Foreign Application Priority Data

Apr. 24, 2002  (JP) .............................. 2002-122467

(51) Int. Cl.
*G02F 1/1335*  (2006.01)
(52) U.S. Cl. ............................ 349/62; 349/96; 349/98; 349/102; 349/112; 349/115; 349/117; 349/118; 349/119; 349/122
(58) Field of Classification Search ................. 349/62, 349/64, 96, 98, 102, 112, 115, 117, 119, 122, 349/176; 359/485, 487, 488, 494, 495, 497, 359/498, 500, 501, 599; 362/26, 606, 607, 362/608

See application file for complete search history.

(56) References Cited

U.S. PATENT DOCUMENTS 3,940,203 A    2/1976 La Russa (Continued)

FOREIGN PATENT DOCUMENTS

DE    3836955    5/1990

(Continued)

OTHER PUBLICATIONS

Partial computer-generated English translation of JP 2002-258048, published Sep. 2002.*
European Search Report dated Apr. 23, 2007 issued in corresponding European Application No. 03 72 3146.
European Search Report dated Jun. 29, 2007, issued in corresponding European Patent Application No. 03 723 146.

*Primary Examiner*—Toan Ton
*Assistant Examiner*—Tai Duong
(74) *Attorney, Agent, or Firm*—Westerman, Hattori, Daniels & Adrian, LLP.

(57) ABSTRACT

A viewing angle magnification liquid crystal display of this invention comprising: at least a backlight system containing a polarization element (A) obtained by disposing a retardation layer (b) between at least two layers, included in a reflection polarizer (a), and having respective selective reflection wavelength bands of polarized light superimposed on each other to conduct collimation for a diffusion light source; a liquid crystal cell transmitting collimated lights; a polarizing plate disposed on both sides of the liquid crystal cell; and a viewing angle magnifying layer disposed on the viewer side of the liquid crystal cell to diffuse transmitted light. The liquid crystal display can realize a thin type and have a wide viewing angle.

29 Claims, 10 Drawing Sheets

U.S. PATENT DOCUMENTS

| | | | |
|---|---|---|---|
| 4,984,872 A | 1/1991 | Vick | |
| 5,089,883 A | 2/1992 | Welker et al. | |
| 5,825,444 A | 10/1998 | Broer et al. | |
| 5,900,334 A | 5/1999 | Wada et al. | |
| 5,928,801 A | 7/1999 | Broer et al. | |
| 5,940,149 A * | 8/1999 | Vanderwerf | 349/5 |
| 6,078,421 A | 6/2000 | Davey et al. | |
| 6,088,079 A | 7/2000 | Kameyama et al. | |
| 6,124,905 A | 9/2000 | Iijima | |
| 6,166,790 A | 12/2000 | Kameyama et al. | |
| 6,217,955 B1 | 4/2001 | Coates et al. | |
| 6,307,604 B1 | 10/2001 | Hikmet et al. | |
| 6,469,755 B1 * | 10/2002 | Adachi et al. | 349/62 |
| 6,573,961 B2 * | 6/2003 | Jiang et al. | 349/115 |
| 6,822,710 B1 | 11/2004 | Son et al. | |
| 2001/0003473 A1 | 6/2001 | Galabova et al. | |
| 2002/0034009 A1 | 3/2002 | Broer et al. | |
| 2002/0036735 A1 | 3/2002 | Arakawa et al. | |
| 2002/0060907 A1 * | 5/2002 | Saccomanno | 362/31 |

FOREIGN PATENT DOCUMENTS

| | | |
|---|---|---|
| DE | 4222028 | 1/1994 |
| EP | 0 578 302 | 1/1994 |
| EP | 0 908 745 A1 | 4/1999 |
| EP | 1 008 886 A1 | 6/2000 |
| JP | 2-158289 | 6/1990 |
| JP | 6-235900 | 8/1994 |
| JP | 2561483 | 9/1996 |
| JP | 10-25528 | 1/1998 |
| JP | 10-510671 | 10/1998 |
| JP | 10-321025 A | 12/1998 |
| JP | 10-333147 | 12/1998 |
| JP | 11-174230 A | 2/1999 |
| JP | 11-281974 | 10/1999 |
| JP | 2000-89018 | 3/2000 |
| JP | 2000-206481 | 7/2000 |
| JP | 2000-235181 | 8/2000 |
| JP | 2001-516066 | 9/2001 |
| JP | 2001-521643 | 11/2001 |
| JP | 2002-55336 | 2/2002 |
| JP | 2002-90535 | 3/2002 |
| JP | 2002-98950 | 4/2002 |
| JP | 2002-258048 | 9/2002 |
| KR | 2001 026728 A | 4/2001 |
| WO | WO 97/12276 | 4/1997 |
| WO | WO 98/49585 | 11/1998 |
| WO | WO 99/09452 | 2/1999 |
| WO | WO 02/25687 | 3/2002 |

* cited by examiner

VIEWING ANGLE MAGNIFICATION LIQUID CRYSTAL DISPLAY UNIT

TECHNICAL FIELD

The present invention relates to a viewing angle magnification liquid crystal display.

BACKGROUND ART

As a system for magnifying a viewing angle of a liquid crystal display, there has been known a method in which lights from backlight are collimated, and only lights in the vicinity of the front, good in contrast and tone are extracted and diffused to thereby obtain a display with the same quality as in the vicinity of the front even when viewed at any angle (see, for example, publications of JP-A Nos. 10-333147 and 10-25528).

In a liquid crystal display of this kind, however, a backlight technique to obtain collimated lights is difficult. In a system proposed in the above patent literatures and others, for example, there have been many problems in practical aspects since a backlight system is thick, poor in light utilization efficiency and high in cost.

In an ordinary TN type liquid crystal display without a viewing angle compensating film, a region in which a high contrast can be acquired is only on the order within ±20° of the front. In a case of an STN liquid crystal, the region is rendered narrower. In order to extract only lights in the vicinity of the front, good in display quality, the following two methods are exemplified;

1) a method in which parallelism of backlight emitted lights are confined within a range of the order of ±20° as a half value width and transmitted light in the vicinity of the front is extended with a diffusion means after transmission of a liquid crystal cell to thereby magnify a viewing angle, and 2) a method in which only lights in the vicinity of the front within ±20° are extracted from lights after transmission of a liquid crystal display and spread with a diffusion means.

In the second method, however, a light loss is large and therefore, the method has not been suited for use in liquid crystal display. On the other hand, in the first method, the parallelism is limited within a range of the order of ±40° if a prism light condensing sheet represented by BEF manufactured by 3M Corp. is employed in a back light. And by means of a shape of a backlight guide member is limited within a range of the order of ±40°, which is short in ability for use in a viewing angle magnification system of a liquid crystal display.

As a collimating means, there has been available a method employing a shielding louver represented by a light control film manufactured by 3M Corp. and others. In the method, however, there has been a problem in brightness because of a large absorption loss in the course of collimation. That is, one of a thickness, brightness and a parallelism of obtained lights have to be sacrificed due to a requirement from design, resulting in many of problems for putting it into practical use. Especially, for use in a note book personal computer or a cellular phone, it is desirable to use a collimation system restricted in increase in thickness to 200 µm or less and preferably, 100 µm or less, and even in a case where a collimation system is built in simultaneously together with a reflecting polarizer for adding a brightness enhancement effect, it is desirable to restrict the maximum increase in thickness to 500 µm or less, which is difficult being realized in the method.

On the other hand, there has been known collimation means with a mirror, a lens, a prism or a light guide member. In these methods, however, a thickness and a weight increase greatly, which negates to establish a position as a useful means in applications other than a projector or the like.

Accordingly, in a viewing angle liquid crystal display, a necessity has arisen that not only is collimation effected in a thin film structure, but a light source is also confined within about ±20°, which is a range in which a good viewing angle characteristic of the liquid crystal display can be attained, and that an absorption loss is further reduced.

In a collimation means using a shielding louver, a microlens array, a prism or the like, a moiré occurs between a fine structure and pixels of the liquid crystal display, thereby having disabled a good display to be obtained. Since light is not emitted from a binding portion in a prism, a clearance between lenses or the like, a regular darkness and brightness in-plane pattern arises in emitted light, resulting in a moiré. In order to prevent a moiré, it is possible to insert a diffusion means, whereas a problem arises that a parallelism of obtained collimated lights is degraded, which has been a problem against putting into practical use.

Even in a case where interference between liquid crystal pixels and a collimating means was alleviated by changing a cycle in the regularity, a case was further observed where interference occurs with a fine structure of a collimated light diffusing means arranged on the display surface side of the liquid crystal display. In a case where a structure having regularity such as a microlens array, a microprism or the like is employed in a collimated light diffusing means, interference occurs with the fine structure thereof.

Therefore, in order to prevent interference of liquid crystal pixels with the collimated light diffusing means, a necessity arises for contrivance of a size of the fine structure of the collimated light diffusing means or a way of arrangement thereof. A design for preventing interference with liquid crystal pixels, however, has been easy to cause a problem to lead to second interference between members themselves that would otherwise cause no interference since the design is the same as a means preventing interference of the collimating means with the liquid crystal pixels.

For example, if a collimating means adopts a size of a structure not interfering with the liquid crystal pixels, a collimated light diffusing means similarly adopts a size of a structure not interfering with the liquid crystal pixels; therefore, both means result in having the sizes interfering with each other. This applies to a contrivance of angles and arrangement in a similar way, which has narrowed a range of an allowable design and restricted a selectable optical system within an extremely small range.

In such a way, a viewing angle magnification system consisting of a collimating means and a collimated light diffusing means has limited options in design because of an optical problem caused by respective fine structures, having lead to difficulty putting the system into practical use.

Investigation about collimation for a light source using a special optical film has been conventionally conducted in addition to a type that employs surface structures, refraction and reflection that requires a large depth and an air interface such as a lens and a mirror prism and a front light condensation/collimation system accompanied by a large absorption loss such as a shielding louver.

Typical methods thereof include a method in which a bright-line light source and a band pass filter are combined. Exemplified are: a publication of JP-A No.6-235900 which is filed by Phillips Corp., a publication of JP-A No.

2-158289 a publication of JP-N No. 10-510671, the specification of U.S. Pat. No. 6,307,604, the specification of DE No. 3836955, the specification of DE 4222028 A1, the specification of EP No. 578302 A, the specification of USP No. 2002/34009 A, a pamphlet of WO 02/25687 A1

A method can be exemplified in which a band pass filter is provided on a bright-line emitting light source/display unit such as CRT or electroluminescence, which are described in the specification of JP No. 2001/521643 A and the specification of JP No.2001/516066 A.

Furthermore, exemplified is a method in which a band pass filter adapted for three wavelengths is provided to a bright-line cold cathode fluorescent lamp that is described in the specification of USP No. 2002/36735 A filed for a patent by Fuji Photo Film Co., Ltd. and publications of JP-A Nos. 2002-90535 and 2002-258048 filed by NITTO DENKO CORPORATION; or the like.

The techniques do not function unless a light source has a bright-line spectrum. Therefore, a problem has remained that is related to design and manufacture of a film selectively functioning for a specific wavelength. In addition, in a case where a band pass filter is of an evaporated interference film, even a reliability problem has existed that a wavelength characteristic alters due to a change in refractive index of a thin film in a humidified environment.

On the other hand, as a collimation system employing a hologram material, exemplified are the specification of U.S. Pat. No. 4,984,872 filed by Rockwell Co. and others. A material of this kind is high in a front transmittance, while an obliquely incident light cannot be perfectly reflected and removed off. In a case where a direct transmittance is measured with incident collimated light, a high transmittance is measured in the front direction because the light passes through as is, while a low transmittance is measured for obliquely incident light because the light is scattered, with no difference observed between transmittances in both cases when a diffusion light source is employed. Therefore, in a case where the system is disposed on an actual diffusion backlight light source, a light condensing function cannot be sufficiently satisfied. Many of hologram materials are soft and weak, having lead to many problems related to reliability.

It is an object of the present invention to provide a liquid crystal display of a thin type and capable of realizing a wide viewing angle.

DISCLOSURE OF THE INVENTION

The present inventors have been conducted serious studies in order to solve the task with the result that a viewing angle magnification liquid crystal display described below has been found, which leads to completion of the present invention. That is, this invention is as follows:

1. A viewing angle magnification liquid crystal display comprising at least:
a backlight system containing a polarization element (A) obtained by disposing a retardation layer (b) between at least two layers, included in a reflection polarizer (a), and having respective selective reflection wavelength bands of polarized light superimposed on each other to conduct collimation for a diffusion light source;
a liquid crystal cell transmitting collimated lights;
a polarizing plate disposed on both sides of the liquid crystal cell; and
a viewing angle magnifying layer disposed on the viewer side of the liquid crystal cell to diffuse transmitted light.

2. The viewing angle magnification liquid crystal display according to above description 1, wherein
the selective reflection wavelengths of the at least two layers of the reflection polarizer (a) are superimposed on each other in the wavelength range of 550 nm±10 nm.

3. The viewing angle magnification liquid crystal display according to above description 1 or 2, wherein
the reflection polarizer (a) is a circular polarization type reflection polarizer (a1) transmitting circularly polarized light but selectively reflecting reverse circularly polarized light, and
the retardation layer (b) comprises a layer (b1) having a front retardation (in the normal direction) of almost zero and a retardation of $\lambda/8$ or more relative to incident light incoming at a direction inclined from the normal direction by 30° or more.

4. The viewing angle magnification liquid crystal display according to above description 1 or 2, wherein
the reflection polarizer (a) is a linear polarization type reflection polarizer (a2) transmitting one of linearly polarized lights perpendicular to each other, but selectively reflecting the other thereof,
the retardation layer (b) comprises a layer (b1) having a front retardation (in the normal direction) of almost zero and a retardation of $\lambda/4$ or more relative to incident light incoming at a direction inclined from the normal direction by 30° or more,
layers (b2) each having a front retardation of about $\lambda/4$ disposed on both sides of the layer (b1), one of the layers (b2) being disposed between the retardation layer (b1) and a corresponding linear polarization type reflection polarizer (a2) and the other of the layers (b2) being disposed between the retardation layer (b1) and another linear polarization type reflection polarizer (a2),
the layer (b2) on the incidence side is arranged at an angle of 45° (−45°)±5° relative to the polarization axis of the linear polarization type reflection polarizer (a2) on the incidence side,
the layer (b2) on the emission side is arranged at an angle of −45° (+45°)±5° relative to the polarization axis of the linear polarization type reflection polarizer (a2) on the emission side, and
the layer (b2) on the incidence side and the layer (b2) on the emission side are arranged at an arbitrary angle formed between the respective slow axes thereof.

5. The viewing angle magnification liquid crystal display according to above description 1 or 2, wherein
the reflection polarizer (a) is a linear polarization type reflection polarizer (a2) transmitting one of linearly polarized lights perpendicular to each other, but selectively reflecting the other thereof,
the retardation layer (b) comprises two biaxial retardation layers (b3) each having a front retardation (in the normal direction) of about $\lambda/4$ and an Nz factor of 2 or more,
the slow axis direction of the layer (b3) on the incidence side is arranged at an angle of 45° (−45°)±5° relative to the polarization axis of the linear polarization type reflection polarizer (a2) on the incidence side,
the slow axis direction of the layer (b3) on the emission side is arranged at an angle of −45° (+45°)±5° relative to the polarization axis of the linear polarization type reflection polarizer (a2) on the emission side, and
the layer (b3) on the incidence side and the layer (b3) on the emission side are arranged at an arbitrary angle formed between the respective slow axes thereof.

6. The viewing angle magnification liquid crystal display according to above description 1 or 2, wherein the reflection polarizer (a) is a linear polarization type reflection polarizers (a2) transmitting one of linearly polarized lights perpendicular to each other, but selectively reflecting the other thereof, the retardation layer (b) comprises one biaxial retardation layer (b4) having a front retardation (in the normal direction) of about λ/2 and an Nz factor of 1.5 or more, the slow axis direction of the layer on the incidence side is arranged at an angle of 45° (−45°)±5° relative to the polarization axis of the linear polarization type reflection polarizer (a2) on the incidence side, the slow axis direction of the layer on the emission side is arranged at an angle of −45° (+45°)±5° relative to the polarization axis of the linear polarization type reflection polarizer (a2) on the emission side, and the polarization axes of the two linear polarization type reflection polarizers (a2) are almost perpendicular to each other.

7. The viewing angle magnification liquid crystal display according to any of above descriptions 1 to 4, wherein the retardation layer (b1) is of a cholesteric liquid crystal phase, having a selective reflection wavelength band in a region outside the visible light region, and fixed in a planar alignment state.

8. The viewing angle magnification liquid crystal display according to any of above descriptions 1 to 4, wherein the retardation layer (b1) is of a rod-like liquid crystal fixed in a homeotropic alignment state.

9. The viewing angle magnification liquid crystal display according to any of above descriptions 1 to 4, wherein the retardation layer (b1) is of a discotic liquid crystal fixed in an alignment state of a nematic phase or a columnar phase.

10. The viewing angle magnification liquid crystal display according to any of above descriptions 1 to 4, wherein the retardation layer (b1) is a biaxially aligned polymer film.

11. The viewing angle magnification liquid crystal display according to any of above descriptions 1 to 4, wherein the retardation layer (b1) is of an inorganic layered compound with a negative uniaxiality fixed in an alignment state so that the normal direction of a surface of the compound is an optical axis.

12. The viewing angle magnification liquid crystal display according to any of above descriptions 3 and 6 to 11, wherein the circular polarization type reflection polarizer (a1) comprises a cholesteric liquid crystal.

13. The viewing angle magnification liquid crystal display according to any of above descriptions 3 and 6 to 12, wherein a λ/4 plate is disposed on the viewer side (the liquid crystal cell side) of the circular polarization type reflection polarizer (a1), and an axis direction of a linearly polarized light obtained by transmission and a transmission axis direction of a polarizing plate on the lower surface side (the light source side) of the liquid crystal display are disposed in alignment with each other.

14. The viewing angle magnification liquid crystal display according to any of above descriptions 4 to 11, wherein the linear polarization type reflection polarizer (a2) is a stretched resin laminate with multiple layers comprising resin materials having respective different refractive indexes and retardation.

15. The viewing angle magnification liquid crystal display according to any of above descriptions 4 to 11 and 14, wherein an axis direction of a linearly polarized light obtained by transmission of the linear polarization type reflection polarizer (a2) and a transmission axis direction of a polarizing plate on the lower surface side (the light source side) of the liquid crystal display are disposed in alignment with each other.

16. The viewing angle magnification liquid crystal display according to any of above descriptions 1 to 15, wherein the viewing angle magnifying layer is a diffusion plate having substantially neither backscattering nor polarization cancellation.

17. The viewing angle magnification liquid crystal display according to any of above descriptions 1 to 16, wherein each of layers is laminated using a transparent adhesive agent or pressure-sensitive adhesive agent. (Action)

As described in the specification of U.S. Pat. No. 2,564,813 and the publication of JP-A No. 10-321025, in a case where a retardation plate controlled so that a retardation value in the vertically incident direction and a retardation value in an obliquely incident direction are specially different from each other is inserted between polarizers, an angular distribution of transmitted light receives a constraint and with an absorption polarizer adopted, only light in the vicinity of the front is transmitted, while peripheral light is all absorbed. On the other hand, with a reflection polarizer used as the polarizer, only light in the vicinity of the front is transmitted while peripheral light is all reflected. With such a theory adopted, emitted lights of the backlight can be condensed and collimated without being accompanied by an absorption loss.

Description will be given of the present invention together with a mechanism of light condensation and brightness enhancement using an ideal model as follows:

FIG. 1 is a descriptive representation showing a principle in a case where a circular polarization type reflecting polarizer (a1) is used as a reflecting polarizer (a). In FIG. 1, as a polarization element (A), a circular polarization type reflection polarizer (a1), a retardation layer (b1) and a circular polarization type reflection polarizer (a1) are disposed in the order starting at the backlight side (the lower side).

A working principle is as described in the steps 1) to 3):

1) With the circular polarization type reflection polarizer (a1) separating a polarized light by reflection, incident light is divided into transmitted light and reflected light by a rotational sense of polarization of incident light. Therefore, no absorption loss occurs.

2) With a special retardation plate (b1) having a front retardation of almost zero and a retardation in an oblique direction of a value, front incident light passes as is.

3) Incident light in an oblique direction is not absorbed and returned back as reflected light. The reflected light is repeatedly reflected till the light is converted to a transmitted light.

The retardation plate (b1) is generally referred to as a negative C plate (negative retardation plate) or a positive C plate (positive retardation plate). The retardation plates (b1) have properties that in the vertical direction (the normal direction), a retardation is close to zero, while when being inclined, a retardation occurs. As typical negative C plates, exemplified are to be concrete: a biaxially stretched polycarbonate film and polyethylene terephthalate film, a film made of a cholesteric liquid crystal, and having a selective reflection wavelength band set to be shorter than visible light, a film made of a discotic liquid crystal aligned in parallel to a plane and a film made of an inorganic crystalline compound, having a negative retardation, and obtained by in-plane alignment. As a typical positive C plate, exemplified is, to be concrete: a liquid crystal film obtained in homeotropic alignment.

A circular polarization type reflection polarizer (a1) in use is a polarizer in which a cholesteric liquid crystal is mainly aligned and a twist pitch is adjusted and fixed (for example, a laminate of plural films having respective different selective reflection central wavelengths or a film in a single layer and having a pitch altering in the thickness direction) so that a selective reflection wavelength band covers a visible light region/a light source emission wavelength band; or the like. The circular polarization type reflection polarizers (a1) disposed on both sides of the retardation plate (b1) of FIG. 1 in use are preferably polarizers with the same rotational sense of transmitted circularly polarized light as each other.

Since a circular polarization type reflection polarizer (a1) and the retardation plate (b1) can be used without designating an adherence direction because of almost non-existence of axes in an in-plane direction for both. Hence, an angular range of confinement of collimation has isotropic/symmetrical characteristics.

Note that description below is given based on the figures; marks (r) are assigned as shown in FIG. 2 such that (i) indicate natural light, (ii) circularly polarized light and (iii) linearly polarized light. The circularly polarized light (ii) is divided into (ii)-1 and (ii)-2, which have respective arrow marks reverse in sense of rotation from each other. This means that senses of rotation of both circularly polarized light are reverse to each other. The (iii)-1 and (iii)-2 mean that polarization axes of both are perpendicular to each other.

Description will be given of a case where the circular polarization type reflection polarizers (a1) shown in FIG. 1 are used as a reflecting polarizer (a), following changes in lights in collimation.

1) Light vertically impinging on the circular polarization type reflection polarizer (a1) included in natural light supplied from a backlight is polarization separated into transmitted light (r3) and reflected light (r2). The transmitted light and the reflected light are reverse in rotational sense of circular polarization to each other.

2) The transmitted light (r3) passes through the retardation layer (b1) as is.

3) Transmitted light (r4) further passes through the circular polarization type reflection polarizer (a1) as is.

4) Transmitted light (r5) is used in a liquid crystal display disposed thereon.

5) On the other hand, light obliquely impinging on the circular polarization type reflection polarizer (a1) included in natural light (r6) supplied from the backlight is polarization separated into transmitted light (r8) and a reflected light (r7). The transmitted light and the reflected light are reverse in rotational sense of circular polarization to each other.

6) Transmitted light (r8) is affected in retardation while passing through the retardation layer (b1). When retardation value of ½ wavelength is given, circularly polarized light changes a current rotational sense thereof to a reverse rotational sense. Hence, a rotational sense of the transmitted light (r8) is inverted after transmission of the retardation layer (b1).

7) Transmitted light (r9) is emitted with a reverse rotational sense under an influence of retardation.

8) The transmitted light (r9) with a reverse rotational sense is reflected back on the circular polarization type reflection polarizer (a1). It has been generally known that a rotational sense of a circularly polarized light is inverted when being reflected (W. A. Shurcliff, Polarized Light: Production and Use, (Harvard University Press, Cambridge, Mass., 1966). As an exception, it has been known that in a case of reflection on a cholesteric liquid crystal layer, no change in rotational sense occurs. Herein, since reflection is performed on a cholesteric liquid crystal surface, no change occurs in either of rotational senses of circular polarization of the transmitted light (r9) and the reflected light (r10).

9) The reflected light (r10) receives an influence of retardation while passing through the retardation layer (b1).

10) Transmitted light (r11) is inverted in rotational sense thereof under an influence of retardation.

11) The transmitted light (r11) returns back with the same rotational sense as the transmitted light (r8) because of inversion of a rotational sense passes through the circular polarization type reflection polarizer (a1) as is.

12) Reflected light (r2, r7 and r12) returns back to the backlight side and recycled. These returned light is repeatedly reflected till the light changes propagation directions and a rotational sense of polarization at random by a diffusion plate and others disposed in the backlight and thereby converted to light that can again transmit in the vicinity of the normal direction to a polarizer (A), thereby contributing to brightness enhancement.

13) Since the transmitted circularly polarized light (r5) can be converted to linearly polarized light by disposing a λ/4 plate, the light can be used in a liquid crystal display without causing absorption loss.

In connection with a transmittance and reflectance of the circular polarization type reflection polarizer (a1) using a cholesteric liquid crystal, a wavelength characteristic of a transmitted light shifts to the short wavelength side relative to incident light in an oblique direction. Therefore, in order to function sufficiently on incident light at a deep angle, a necessity arises that a sufficient polarization characteristic/retardation characteristic is ensured in the long wavelength side outside the visible light region. While the retardation layer (b1) used in this system, ideally and theoretically, would have only to have a retardation of ½ wavelength, to be exact, in an oblique direction, a circular polarization type reflection polarizer (al: a cholesteric liquid crystal layer) actually used has a property as a negative retardation plate to some extent. Hence, the retardation layer (b1) can exert the optical function of the present invention if the layer has a retardation of ⅛ wavelength or more in an oblique direction.

In a case where the reflection polarizer (a) is a linear polarization type reflection polarizer (a2), an optical axis relative to a light incident a C plate in an oblique direction is always perpendicular to a light direction, for example, if the C plate (retardation layer (b1)) is used alone as a retardation layer. Hence, retardation is not produced to thereby cause no polarization conversion. Therefore, in a case where the linear polarization type reflection polarizer (a2) is employed, λ/4 plates (b2) each having the slow axis direction at an angle of 45° or −45° relative to the polarization axis of the linear polarization type reflection polarizer (a2) are disposed on both sides of the C plate. With such a construction applied, an operation can be performed that the linearly polarized light is converted to a circularly polarized light with the λ/4 plate (b2), thereafter, the circularly polarized light is converted to an inverted circularly polarized light by a retardation of the C plate and the circularly polarized light can be again converted to linearly polarized light with the λ/4 plate (b2).

FIG. 3 is a conceptional view showing a process in which natural light is polarization separated to a linearly polarized light with the linear polarization type reflection polarizer (a2) and further converted to circularly polarized light with the λ/4 plate (b2).

FIG. 4 is a conceptional representation in a case where a linear polarization type reflection polarizer (a2) is employed as the reflection polarizer (a). In FIG. 4, as the polarizing element (A), a linear polarization type reflection polarizer (a2), a λ/4 plate (b2), a retardation layer (b1) and a linear polarization type reflection polarizer (a2) are disposed in the order starting at the backlight side (the lower side).

FIG. 5 is an example of laminate angles of respective films in a collimation system shown in FIG. 4. A double head arrow mark shown on a linear polarization type reflection polarizer (a2) is the polarization axis and a double head arrow mark shown on the λ/4 plate (b2) is the slow axis. Two pairs of the polarization axis of a linear polarization type reflection polarizer (a2) and the slow axis of a λ/4 plate (b2) are arranged on both sides of the C plate: the retardation layer (b1) so as to be at an angle of 45° (−45°)±5° relative to each other. The combinations are shown as set1 and set 2, respectively. Note that an angle formed between the axes of the λ/4 plates (b2) on the incidence side and the emission side is arbitrary.

If an angle formed between a polarization axis of the linear polarization type reflection polarizer (a2) and a slow axis of the λ/4 plate (b2) is maintained at a value of 45° (−45°) relative to each other, the set1 and the set2 may be rotated. Since the C plate: the retardation layer (b1) has no axis direction in a plane, the C plate can be disposed without designation of an angle.

Description will be given, following changes in collimated lights shown in FIGS. 4 and 5.

1) Part of natural light (r14) supplied from a backlight vertically impinges on the linear polarization type reflection polarizer (a2).

2) The linear polarization type reflection polarizer (a2) transmits linearly polarized light (r15) and reflects linearly polarized light (r16) in a direction perpendicular thereto.

3) The linearly polarized light (r15) transmits the λ/4 plate (b2) and is converted to circularly polarized light (r17).

4) The circularly polarized light (r17) passes through the retardation layer (b1) as is.

5) Circularly polarized light (r18) passes through the λ/4 plate (b2) and is converted to linearly polarized light (r19).

6) The linearly polarized light (r19) passes through the linear polarization type reflecting polarizer (a2) as is.

7) Linearly polarized light (r20) impinges on a liquid crystal display disposed thereon and transmitted through without a loss.

8) On the other hand, part of natural light (r21) supplied from the backlight impinges obliquely on the linear polarization type reflection polarizer (a2).

9) The linear polarization type reflection polarizer (a2) transmits a linearly polarized light (r22) and reflects linearly polarized light (r23) in a direction perpendicular thereto.

10) The linearly polarized light (r22) transmits the λ/4 plate (b2) and is converted to circularly polarized light (r24).

11) The circularly polarized light (r24) is affected of a retardation of ½ wavelength and a rotational sense thereof is inverted while passing through the retardation layer (b1).

12) Circularly polarized light (r25) with a reverse rotational sense passes through the λ/4 plate (b2) and is converted to linearly polarized light (r26).

13) The linearly polarized light (r26) is reflected back on the linear polarization type reflection polarizer (a2) and converted to linearly polarized light (r27).

14) The linearly polarized light (r27) passes through the λ/4 plate (b2) and is converted to circularly polarized light (r28).

15) The circularly polarized light (r28) is affected of a retardation of ½ wavelength and a rotational sense thereof is inverted while passing through the retardation layer (b1).

16) Circularly polarized light (r29) with a reverse rotational sense passes through the λ/4 plate (b2) and is converted to linearly polarized light (r30).

17) The linearly polarized light (r30) passes through the linear polarization type reflection polarizer (a2) as is.

18) Reflected light (r16, r23 and r31) returns back to the backlight side and recycled.

While in an ideal system, an angle between the slow axis of a λ/4 plate (b2) described herein and the polarization axis of a linear polarization type reflection polarizer (a2) theoretically in essence is 45°, characteristics of the linear polarization type reflection polarizer (a2) and the λ/4 plate (b2) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arise other problems such as reduction in transmittance and others. Therefore, it is desirable that adjustment is actually performed within a range of the order of ±5°.

In connection with a transmittance and reflectance of the linear polarization type reflection polarizer (a2), that a wavelength characteristic of a transmitting light shifts relative to incident light in an oblique direction to the short wavelength side is the same as in the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

The linear polarization type reflection polarizer (a2) has a smaller negative retardation characteristic of its own as compared with that of a cholesteric liquid crystal. Therefore, a retardation in an oblique direction (an inclination of 30°) of the retardation layer (b1) used by being inserted between the linear polarization type reflection polarizers (a2) is somewhat larger than in the case of the circular polarization type reflection polarizers (a1) using a cholesteric liquid crystal and preferably ¼ wavelength or more.

In a case where the reflection polarizer (a) is the linear polarization type reflection polarizer (a2), which is different from the above described case, a similar effect can also be obtained by replacing the structure in which the C plate: the retardation layer (b1) is sandwiched between the two λ/4 plates (b2) with two biaxial retardation layers (b3) each of which has a front retardation of about λ/4, and a retardation in the thickness direction of about λ/2 or more. Such a biaxial retardation layer (b3) with an Nz factor of 2 or more satisfies the above described required conditions.

FIG. 6 is a conceptional representation in a case where the linear polarization type reflection polarizers (a2) are adopted as reflection polarizers (a) and the biaxial retardation layers (b3) is employed. In FIG. 6, as a polarization element (A), a linear polarization type reflection polarizer (a2), a biaxial retardation layer (b3), a biaxial retardation layer (b3) and a linear polarization type reflection polarizer (a2) are disposed in the order starting at the backlight side (the lower side).

FIG. 7 is an example of laminate angles of films in the collimation system shown in FIG. 6. A double head arrow mark shown on a linear polarization type reflection polarizer (a2) is the polarization axis; a double head arrow shown on a retardation layer (b1) is the slow axis. The polarization axis of a linear polarization type reflection polarizer (a2) and the slow axis of a biaxial retardation layer (b3) are arranged at an angle of 45° (−45°)±5° therebetween. The combinations are indicated by set 1 and set 2, respectively.

For ease in description of optical paths, there is exemplified a case where the linear polarization type reflection polarizers (a2) disposed one above the other have the respective polarization axes parallel to each other and slow axes of the two biaxial retardation layers (b3) one on the other are perpendicular to each other. The biaxial retardation layers (b3) one on the other has the respective slow axes forming an arbitrary angle therebetween. The set 1 and set 2 may be rotated as far as an angle between the polarization axis of a linear polarization type reflection polarizer (a2) and the slow axis of a biaxial retardation layer (b3) is maintained at a value of 45° (−45°) relative to each other.

Description will be given, following changes in collimated lights shown in FIGS. 6 and 7.

1) Part of natural light (r32) supplied from a backlight impinges vertically on the linear polarization type reflection polarizer (a2).

2) The linear polarization type reflection polarizer (a2) transmits linearly polarized light (r33) and reflects linearly polarized light (r34) in a direction perpendicular to the linearly polarized light (r33).

3) The linearly polarized light (r33) transmits the two biaxial retardation layers (b3) each with a front retardation of about ¼ wavelength. Herein, since the slow axes of the two biaxial retardation layers (b3) one on the other are perpendicular to each other at 90°, the front retardation is 0. Therefore, linearly polarized light (r35) passes through as is.

4) The linearly polarized light (r35) passes through the linear polarization type reflection polarizer (a2) as is.

5) Linearly polarized light (r36) impinges on a liquid crystal display and transmitted without a loss.

6) On the other hand, part of natural light (r37) supplied from the backlight impinges obliquely on the linear polarization type reflection polarizer (a2).

7) The linear polarization type reflection polarizer (a2) transmits linearly polarized light (r38) and reflects linearly polarized light (r39) in a direction perpendicular to thereof.

8) The linearly polarized light (r38) impinges obliquely on the two biaxial retardation layers (b3). Since the two biaxial retardation layers (b3) each have a front retardation of ¼ wavelength and an Nz factor of 2 or more, linearly polarized light (r40) transmitted through the two biaxial retardation layers (b3) changes the polarization axis direction thereof by 90° because of a change in retardation in the thickness direction.

9) Linearly polarized light (r40) impinges on the linear polarization type reflection polarizer (a2).

10) Since the linear polarization type reflection polarizers (a2) one above the other have the polarization axes in the same direction, the linearly polarized light (r40) is reflected as a reflected light (r41).

11) The reflected light (r41) is affected of a retardation while passing through the two biaxial retardation layers (b3) in a similar way to that in the step 8) to thereby form linearly polarized light (r42) with the polarization axis direction thereof rotated by 90°.

12) The linearly polarized light (r42) passes through the linear polarization type reflection polarizer (a2) as is.

13) Reflected light (r34, r39 and r43) returns back to the backlight side and recycled.

The polarization element (A) shown in FIGS. 6 and 7 have the two biaxial retardation layers (b3), having a front retardation of about ¼ wavelength and an Nz factor of 2 or more, laminated one on the other each. This structure can produces almost the same characteristic as in the case employing a three layered laminate of the structure in which the C plate : the retardation layer (b1) is sandwiched between the two λ/4 plates (b2), which is shown in FIGS. 4 and 5. Therefore, the number of laminated layers is smaller and productivity is somewhat more excellent than the above described polarization element (A).

While in an ideal system, an angle between the slow axis of a retardation plate (b3) and the polarization axis of a linear polarization type reflection polarizer (a2) described herein theoretically in essence is 45°, characteristics of the linear polarization type reflection polarizer (a2) and the retardation layer (b3) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arises a case where other problems such as reduction in transmittance and others occur. Therefore, it is desirable that adjustment is actually performed within a range of the order of ±5°.

In connection with a transmittance and reflectance of the linear polarization type reflection polarizer (a2), that a wavelength characteristic of transmitted light shifts relative to incident light in an oblique direction to the short wavelength side is the same as the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

In a case where a reflection polarizer (a) is a linear polarization type reflection polarizer (a2), a similar effect can also be obtained by disposing a biaxial retardation layer (b4) having a front retardation of about λ/2 and a retardation in the thickness direction of λ/2 or more as a retardation layer (b). Such a biaxial retardation layer (b4) with an Nz factor of 1.5 or more satisfies the above described required conditions.

FIG. 8 is a conceptional representation in a case where a linear polarization type reflection polarizer (a2) is employed as a reflection polarizer (a). In FIG. 8, as the polarization element (A), a linear polarization type reflection polarizer (a2), a biaxial retardation layer (b4) and a linear polarization type reflection polarizer (a2) are disposed in the order starting at the backlight side (the lower side).

FIG. 9 is an example of laminate angles of films in the collimation system shown in FIG. 8. A double head arrow mark shown on a linear polarization type reflection polarizer (a2) is the polarization axis and, a double head arrow shown on a retardation layer (b4) is the slow axis. The polarization axes of the linear polarization type reflection polarizer (a2) one above the other are arranged so as to be perpendicular to each other. The slow axis of a biaxial retardation layer (b4) and the polarization axis of a linear polarization type reflection polarizer (a2) are arranged at an angle of 45° (−45°)±5° therebetween.

Description will be given, following changes in collimated lights in the above described example shown in FIGS. 8 and 9.

1) Part of natural light (r47) supplied from a backlight impinges vertically on the linear polarization type reflection polarizer (a2).

2) The linear polarization type reflection polarizer (a2) transmits linearly polarized light (r48) and reflects linearly polarized light (r49) in a direction perpendicular to the linearly polarized light (r48).

3) The linearly polarized light (r48) transmits the biaxial retardation layer (b4) with a front retardation of about ½ wavelength and converted to linearly polarized light (r50) and a direction of the polarization axis thereof is rotated by 90°.

4) The linearly polarized light (r50) passes through the linear polarization type reflection polarizer (a2) as is.

5) Transmitted linearly polarized light (r51) impinges on a liquid crystal display and is transmitted without a loss.

6) On the other hand, part of natural light (r52) supplied from the backlight impinges obliquely on the linear polarization type reflection polarizer (a2).

7) The linear polarization type reflection polarizer (a2) transmits linearly polarized light (r53) and reflects linearly polarized light (r54) in a direction perpendicular to the linearly polarized light (r53).

8) The linearly polarized light (r53) impinges obliquely on the biaxial retardation layer (b4). Since the biaxial retardation layer (b4) has a front retardation of about ½ wavelength and an Nz factor of 2 or more due to the effect of the retardation in the thickness direction, the linearly polarized light (r53) transmits the biaxial retardation layer (b4) as a linearly polarized light (r55) in the same state as the linearly polarized light (r53) with respect of a direction of the polarization axis.

9) Transmitted linearly polarized light (r55) is reflected on the linear polarization type reflection polarizer (a2) and converted to reflected light (r56).

10) The reflected light (r56) impinges on the retardation layer (b4). On this occasion, the reflected light (r56) transmits without altering the axis direction.

11) Transmitted linearly polarized light (r57) passes through the linear polarization type reflection polarizer (a2) as is, as linearly polarized light (r58).

12) Reflected light (r49, r54 and r58) returns back to the backlight side and recycled.

The polarization element (A) shown in FIGS. 8 and 9 include the single biaxial retardation layer (b4) having a front retardation of about ½ wavelength and an Nz factor of 1.5 or more. This structure can produce almost the same characteristic as in the case where the three layered laminate in a structure in which the C plate: the retardation layer (b1) is sandwiched between the two λ/4 plates (b2), which is shown in FIGS. 4 or 5. Therefore, the number of layers in the laminate is less and somewhat more excellent in productivity as compared with those of the above described polarization element (A). Moreover, the polarization element (A) shown in FIGS. 8 and 9 is more excellent than the case where a two layer laminate is used as sown in FIGS. 6 and 7.

While in an ideal system, an angle between the slow axis of the retardation plate (b4) and the polarization axis of a linear polarization type reflection polarizer (a2) described herein theoretically in essence is 45°, characteristics of the linear polarization type reflection polarizer (a2) and the retardation plate (b4) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arises a case where other problems such as reduction in transmittance and others occur. Therefore, it is desirable that adjustment is actually performed within a range of the order of ±5°.

In connection with a transmittance and reflectance of the linear polarization type reflection polarizer (a2), that a wavelength characteristic of a transmitted light shifts relative to incident light in an oblique direction to the short wavelength side is the same as the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

A polarization element (A), as shown in FIGS. 1 to 9, has a retardation layer (b) converting light impinging at an incidence angle of 30° inclined from the normal direction to polarized light with an axis direction to be reflected by two reflection polarizers (a) and the polarization element (A) functions a total reflection at an incidence angle of 30° not to transmit light at an incidence angle close to 30°. The polarization element (A) has a substantially high transmittance at an incidence angle in the range of the order of from ±15° to ±20° inclined from the normal direction while light at an incidence angle higher than the range is reflected and recycled. Hence, transmitted lights from a light source are concentrated in the above range and condensed and collimated.

Thus obtained beam collimated backlight, as features thereof, is thinner and makes a light source with a high light parallelism to be obtained with more of ease than in a conventional practice. In addition, since collimation is realized by polarizing reflection substantially without absorption loss, reflected non-collimated light component returns to the backlight side and scattering reflected, wherein only a collimated light component of the scattered reflected light is extracted for recycling, which process is repeated, thereby enabling a substantially high transmittance and a substantially high light utilization efficiency to be achieved.

As a collimated light diffusing means, preferably used is a diffusion plate described in the specifications of JP-A Nos. 2000-347006 and 2000-347007 having low backscattering. In this case, a viewing angle is magnified isotropically so that there is observed no difference between viewing angle characteristics of images in upper and lower portions of the screen or in right and left portions thereof. A liquid crystal display having such a characteristic is preferably employed in any of applications to DTP, a digital camera, a video camera and others, which are in more of cases used by changing a facing direction of the liquid crystal display in every direction when viewed therethrough.

Since with employment of a diffusion plate having anisotropy in light diffusibility as observed in a hologram material or a microlens array sheet controlled in shape anisotropy, a viewing angle characteristic in a direction, from left to right, and a downward direction can be selectively improved, the diffusion plate or the sheet is preferably used in application to a television set with a horizontally long screen.

A retardation anisotropy control type collimating means used in this invention is characterized by that no in-plane fine structure is visually recognized when being viewed along a surface direction in optical observation, absolutely no interference is observed between liquid crystal pixels, a black matrix, a film having a fine structure used in a collimating means, a glare-treated surface as the outermost surface of the liquid crystal display and others, which fine structures are no cause for a moiré.

A moiré, shown in FIG. 10, is a pattern of darkness and brightness having a frequency lower than that of a lattice visually recognized when layers are superimposed with lattices formed in the respective different layers at angles therebetween.

A pitch of a moiré stripe is expressed by the following formula 1:

$$\left(\frac{1}{S3}\right)^2 = \left(\frac{1}{S1}\right)^2 + \left(\frac{1}{S2}\right)^2 - \frac{2\cos\alpha}{S1 \times S2}$$

In the formula 1, S1 indicates a first lattice pitch, S2 a second lattice, S3 a moiré fringe pitch and α an angle formed between the first lattice and the second lattice.

If a visibility (V) of a moiré stripe is calculated with definition of the maximum value of intensities I of a moiré stripe obtained by superimposing different lattices in such a way as Imax, the minimum value thereof as Imin, the visibility is given by a mathematical expression: V=(Imax−Imin)/(Imax+Imin). In order to decrease the contrast, it is desirable that an angle between the lattices is sufficiently large and close to perpendicularity. Three or more layers each having a lattice is hard to satisfy the required condition. Therefore, in order to suppress a moiré phenomenon, it is effective to reduce layers each having a lattice structure and it is understood that a polarization element of this invention with no lattice structure is greatly effective for manufacture of a viewing angle magnification system.

A thin film layer producing collimated lights has a thickness at a level in the range of from tens to hundreds of µm including even a reflection polarizer, which makes it easy to design an extremely thin type as compared with a prism array or microlens sheets. Since an air interface does not require, adherence of layers is enabled, leading to a great advantage obtained in handling. For example, in a case where employed is a cholesteric liquid crystal polymer (about 10 µm) as a reflection polarizer, retardation plates used in combination are coated thin films (about 5 µm) made of a liquid crystal polymer and if the films are laminated with an adhesive agent (about 5 µm), a total thickness can be thinned to 50 µm or less. A further thinner layer composite can be realized if the layers are directly coated without interfaces.

EFFECT OF THE INVENTION

A viewing angle magnification liquid crystal display of this invention condenses emitted lights only in view fields each having the highest contrast and good color reproducibility. As a result, a picture image obtained from the liquid crystal display can be brighter only in view fields good in display quality.

As for a thickness, a functional film realizing collimation is 200 µm or less and if a thickness of a support base material used in manufacture is excluded, an optical film with a practically sufficient performance is obtained on the order of tens of µm. This thickness range has not been realized with a material for geometric optics such as conventionally used lens, prism and others. That is, this is a great advantage as compared with a viewing angle magnification system having been conventionally proposed.

Adoption of this system to make uniform lights with good display characteristic in a region in the vicinity of the front and to magnify a view angle enables a liquid crystal display high in durability to gray scale inversion and a change in hue and good in viewing angle characteristic to be obtained. In this system, a cell of the liquid crystal display acquires a sufficiently high characteristic even in a case where no compensation film is applied to an ordinary TN liquid crystal that has been conventionally available and no necessity arises for liquid crystal alignment control or a special retardation plate provided at high cost.

According to a viewing angle magnification liquid crystal display of this invention, a thin type viewing angle magnification system, which has not been conventionally available, can be, in such a way, realized with ease at a low cost.

BEST MODE FOR CARRYING OUT THE INVENTION

Figure 1:
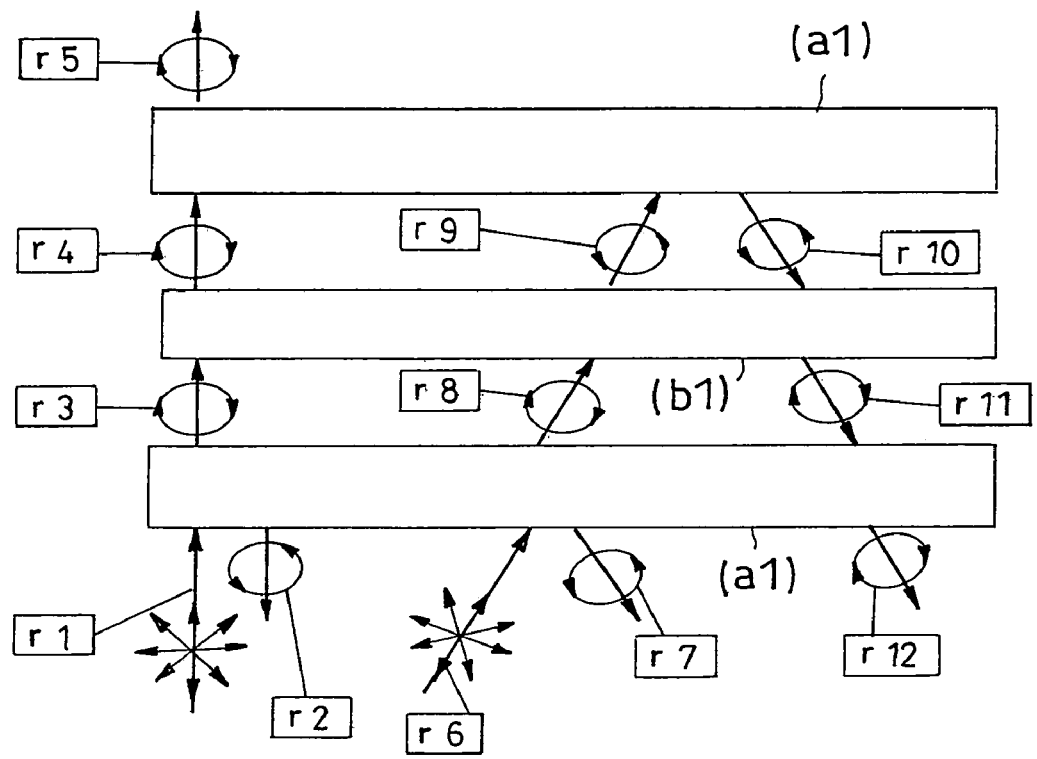
FIG. 1 is a conceptional representation showing an example of the fundamental principle for collimation of a polarization element (A).
Figure 2:
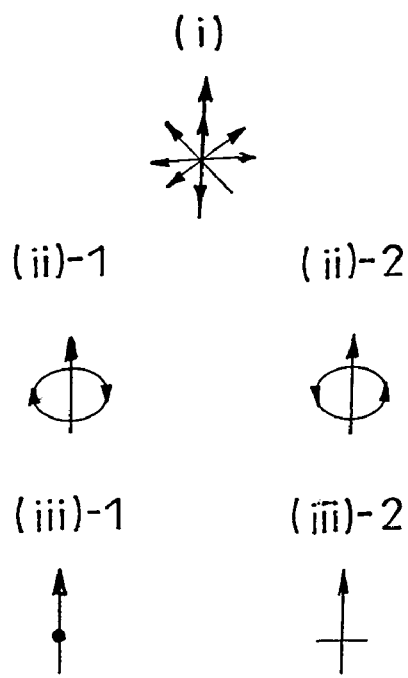
FIG. 2 is diagrams describing each of the states of lights in FIGS. 1, 3, 4, 6 and 8.

Illustrations of preferred embodiments of a viewing angle magnification liquid crystal display of the present invention are below as shown in FIGS. 11 to 16 and 18.

A polarization element (A) of this invention can be formed by inserting a retardation layer (b) showing the special values of a front retardation and a retardation relative to obliquely incident light between at least two reflection polarizers (a) having respective selective reflection wavelength bands of polarized light superimposed on each other to thereby superimpose the layers physically on each other.

With such a construction adopted, part of light transmitted obliquely through a reflection polarizer on the incidence side can be totally reflected by a reflection polarizer on the emission side. With this effect, a liquid crystal display disposed on a backlight light source by which light condensation and collimation are performed can use lights only in a region in the vicinity of the front and high in display quality to thereby spread lights good in display quality using a light diffusing means for magnification of a viewing angle disposed on the viewer side and to enable a viewing angle magnification system to be formed.

(Reflection Polarizer (a))

It is desirable to achieve a total reflection of light with a wavelength in the vicinity of 550 nm high in visual sensitivity from the viewpoint of brightness enhancement and it is desirable that a selective reflection wavelength of the reflection polarizer (a) is superimposed on light at least in a wavelength region of 550 nm ±10 nm.

In a backlight using a wedge type light guide plate adopted in more of liquid crystal displays, for example, angles of emitted lights from the light guide plate are about 60° inclined from the normal direction. A blue shift amount at this angle reaches about 100 nm. Therefore, it is understood that in a case where a 3 wavelength cold cathode fluorescent lamp is employed as the backlight, a necessity arises that a selective reflection wavelength reaches to the wavelength side longer than at least 710 nm since a red bright-line spectrum is at 610 nm. Since a selective reflection wavelength bandwidth necessary in the long wavelength side, as described above, depends largely on an incidence angle and a wavelength of incident light from the light source, a long wavelength end thereof is set arbitrarily according to required specifications.

In a case where the backlight light source emits only a specific wavelength, for example, in a case of a colored cold cathode fluorescent lamp, it is only required to enable only an obtained bright line to be shielded.

In a case where emitted lights from the backlight are confined in a range in the front direction in advance in design of a microlens, dots, a prism, and others, it is not necessary to remarkably extend a selective reflection wavelength to the long wavelength side since transmitted light at a large incidence angle can be neglected. A design can be affected properly so as to be adapted for combined members and a kind of light source.

The reflection polarizers (a) may be either a combination of absolutely the same members or a combination of one member reflecting all the wavelengths of visual light thereon and the other reflecting part thereof thereon.

(Circular Polarization Type Reflection Polarizer (a1))

For example, a cholesteric liquid crystal material is used in a circular polarization type reflection polarizer (a1). In a circular polarization type reflection polarizer (a1), a central wavelength in selective reflection is determined by a formula $\lambda=np$ (wherein n indicates a refractive index of a cholesteric material and p indicates a chiral pitch). For obliquely incident light, the superimposed wavelength region is preferably wider since a selective reflection wavelength is subjected to a blue shift.

In a case where a circular polarization type reflection polarizer (a1) is made of a cholesteric materials, a similar polarizer can be obtained even in combination of different types (which are of a right hand twist and a left hand twist) in a way such that according to a similar way of thinking, a retardation is zero or $\lambda$ if a front retardation is inclined at $\lambda/2$, whereas the similar polarizer is unprofitable since a problem arises because of anisotropy or coloring abnormality according to an azimuth of the inclined axis. While from such a viewpoint, it is preferable to combine members of the same type (between only members with a right hand twist or only members with a left hand twist), coloring abnormality can also be suppressed by cancellation with combination of cholesteric liquid crystal molecules one above the other or a C plate different in wavelength distribution characteristic from each other.

A proper cholesteric liquid crystal may be used as a cholesteric liquid crystal constituting a circular polarization type reflection polarizer (a1) without imposing any specific limitation. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyarylate, polyamide imide, polyether imide or the like formed on a support base material having as low a birefringence retardation as possible such as triacetyl cellulose, amorphous polyolefin or the like; an alignment film made of an obliquely evaporated layer made of $SiO_2$; an alignment film made of a base material using a surface nature and state of a stretched base material such as polyethylene terephthalate, polyethylene naphthalate or the like; an alignment film made of a base material with fine surface irregularity of projections and depressions having a fine alignment control force formed thereon obtained by treating a surface thereof with a fine grinding agent represented by a rubbing cloth or red iron oxide; an alignment film made of a base material having an alignment film producing a liquid crystal control force by illuminating an azobenzene compound or the like on a base material film described above with light formed thereon; and others, and the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods.

A structure may also be fixed by illuminating with energy such as ultraviolet, an ion beam or the like at a stage where an alignment state is established. A base material with a low birefringence of the above described base materials may also be used as a liquid crystal layer support as is. In a case where a base material with a high birefringence is adopted or where a request for a thickness of a polarization element (A) is severe, a liquid crystal layer can be separated from the alignment base material for proper use.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method; a printing method; a dip coating method; a flow film forming method; a bar coating method; a gravure printing method and others, to further dry the thin film, when required. Examples of the solvent that can be properly used include: chlorine containing solvents such as methylene chloride, trichloroethylene and tetrachloroethane; ketone solvents such as acetone, methyl ethyl ketone and cyclohexanone; aromatic solvents such as toluene; cycloalkanes such as cycloheptane; and N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well. Note that in development of a liquid crystal polymer, there can be adopted a superimposition scheme for cholesteric liquid crystal layers with alignment films interposed between layers for the purpose to realize a thinner, if necessary.

One of the optical layers can also be separated from a support base material/an alignment base material therefore used in film formation and transferred onto another optical material for use when required.

(Linear Polarization Type Reflection Polarizer (a2))

Examples of the liner polarization type reflection polarizer (a2) include: a grid type polarizer; a multilayer thin film laminate with two or more layers made of two or more kinds of materials having a difference between refractive indexes; evaporated multilayer thin film having different refractive indexes used in a beam splitter or the like; a multi-birefringence layer thin film laminate with two or more layers made of two or more kinds of materials each having birefringence; a stretched resin laminate with two or more layers using two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by polyethylene naphthalate, polyethylene terephthalate and polycarbonate; and resins each generating a low retardation, such as an acrylic resin represented by polymethacrylate; and a norbornene resin and others represented by ARTON manufactured by JSR Corp.

(Retardation Layer (b))

The retardation layer (b1) inserted between circular polarization type reflection polarizers (a1) or linear polarization type reflection polarizers (b2) has a retardation in the front direction of almost zero and a retardation of $\lambda/8$ or more relative to incident light at an angle of 30° inclined from the normal direction. It is desirable to have a front retardation of $\lambda/10$ or less since it is the purpose to retain vertically impinging polarized light.

Retardation relative to incident light in an oblique direction is properly determined according to an angle at which total reflection is effected for efficient polarization conversion. In order to perfectly realize total reflection at an angle of the order of 60° inclined from the normal direction, it is only required to determine a retardation so as to be a value of the order of $\lambda/2$ when measured at 60°. Since transmitted light through the circular polarization type reflection polarizer (a1) changes a polarization state thereof by a birefringence like a C plate of the circular polarization type reflection polarizer (a1) itself as well, a retardation when measured at the angle of the C plate that is usually inserted may be a value less than $\lambda/2$. Since a retardation of the C plate increases monotonously with increase in inclination of incident light, a retardation has only to be $\lambda/8$ or more relative to incident light at an angle of 30° as a target value for effectively causing total reflection at inclination at an angle of 30° or more.

In a case of a design capable of an effective shield of light having an incidence angle of 30° from the front in a polarization element (A) of this invention, transmitted light is sufficiently reduced substantially in a region of an incidence angle of about 20°. In a case where light is limited in this region, transmitted is only light in a region showing a good display of a common TN liquid crystal display. There is a fluctuation due to a kind of liquid crystal in a cell, a condition of an alignment state, a pretilt angle and the like in a used TN liquid crystal display, neither gray scale inversion nor sudden degradation in contrast occurs; therefore, this is a standard adopted for magnification of a viewing angle in this invention. Other contrivances may also be applied that a larger retardation value of a retardation layer is used in order to confine only front light and that milder confinement is given with a smaller retardation value in a particular situation where a compensating retardation plate is combined with a TN liquid crystal.

Any of materials can be used in the retardation layer (b1) without a specific limitation as far as it has an optical characteristic as described above. Exemplified are: a layer having a fixed planar alignment state of a cholesteric liquid crystal having a selective reflection wavelength in a region outside a visible light region (ranging from 380 nm to 780 nm); a layer having a fixed homeotropic alignment state of a rod-like liquid crystal; a layer using columnar alignment or nematic alignment of a discotic liquid crystal; a layer in which a negative uniaxial crystal is aligned in a plane; a layer made of a biaxially aligned polymer film; and others.

As for a C plate, for example, a C plate having a fixed planar alignment state of a cholesteric liquid crystal having a selective reflection wavelength in a region outside the visible light region (ranging from 380 nm to 780 nm) is desirable to have no coloring abnormality in the visible light region with respect to a selective reflection wavelength of a cholesteric liquid crystal. Hence, a necessity arises for a selective reflection light not to be in the visible region. Selective reflection is specially determined by a cholesteric chiral pitch and a refractive index of a liquid crystal. A value of a central wavelength in selective reflection may be in the near infrared region, whereas it is more desirably in an ultraviolet region of 350 nm or less because of an influence of optical rotation exerted or occurrence of a slightly complex phenomenon. Formation of a cholesteric liquid crystal layer is performed in a similar way to that in formation of a cholesteric liquid crystal layer in the reflection polarizer described above.

A C plate having a fixed homeotropic alignment state is made of a liquid crystalline thermoplastic resin showing a nematic liquid crystallinity at a high temperature; a polymerized liquid crystal obtained by polymerizing a liquid crystal monomer and an alignment agent, when required, under illumination with ionizing radiation such as an electron beam, ultraviolet or the like, or with heating; or a mixture thereof. While a liquid crystallinity may be either lyotropic or thermotropic, a thermotropic liquid crystal is desirable from the view point of ease of control and formability of monodomain. A homeotropic orientation is obtained for example in a procedure in which a birefringent material described above is coated on a film made of a vertically aligned film (such as a film of a long chain alkylsilane) and a liquid crystal state is produced and fixed in the film.

As a C plate using a discotic liquid crystal, there is available a plate obtained by producing and fixing a nematic phase or a columnar phase in a discotic liquid crystal material having an optically negative uniaxiality such as a phthalocyanines or a triphenylene compounds each having an in-plane spread molecule as a liquid crystal material. Inorganic layered compounds each with a negative uniaxiality are detailed in a publication of JP-A No. 6-82777 and others.

A C plate using a biaxial alignment of a polymer film can be obtained by one of the following methods, in which a polymer film having positive refractive index anisotropy is biaxially stretched in a good balance; in which a thermoplastic resin is pressed; and in which a C plate is cut off from a parallel aligned crystal.

Figure 3:
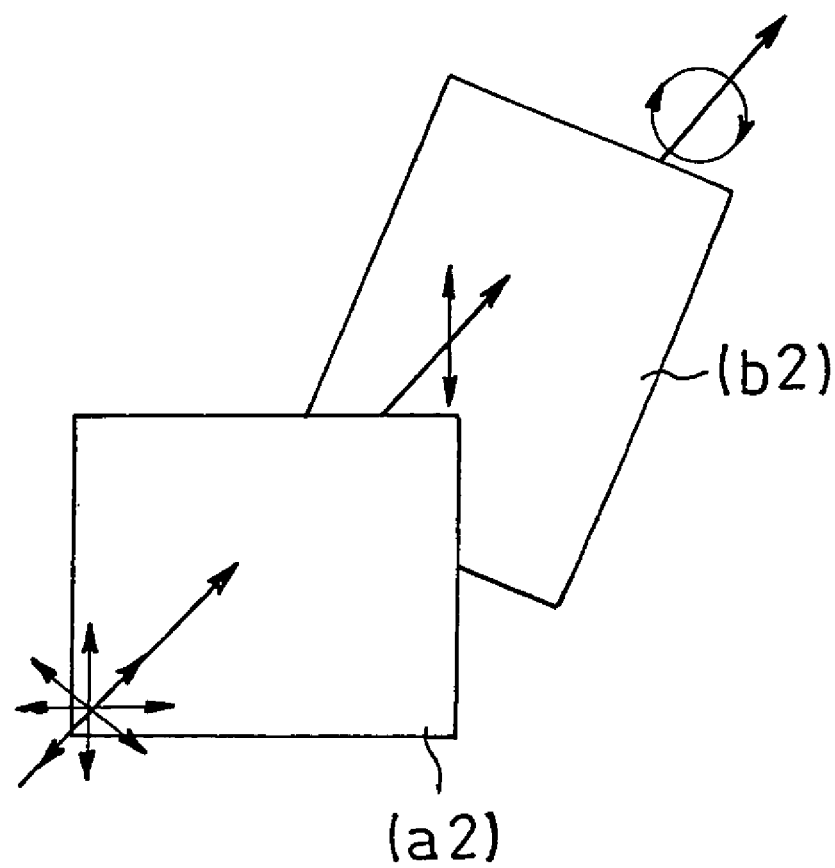
FIG. 3 is a conceptional view showing conversion of linearly polarized light to circular polarization.
Figure 4:
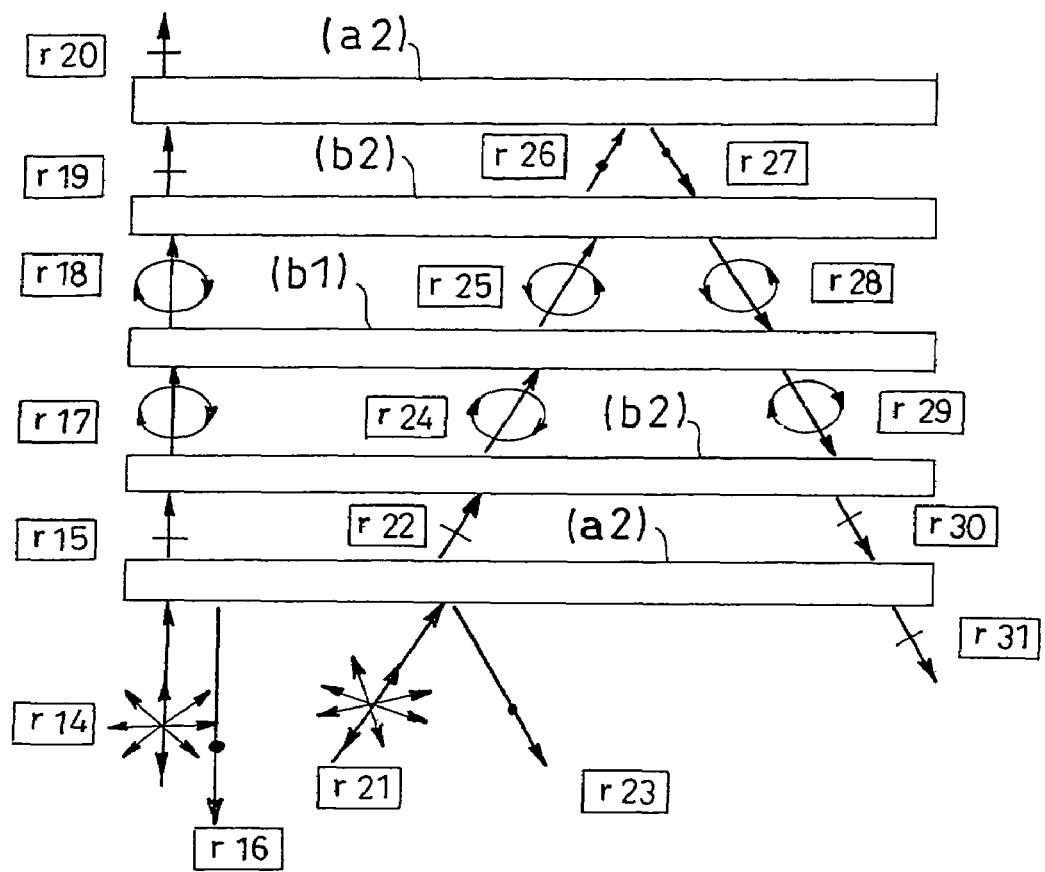
FIG. 4 is a conceptional representation showing an example of the fundamental principle of collimation of a polarization element (A).
Figure 5:
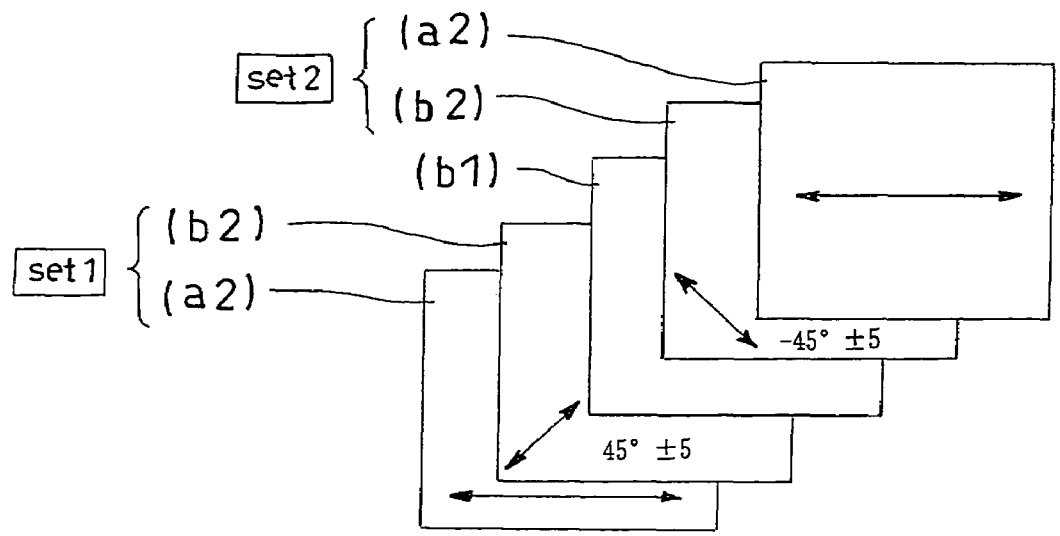
FIG. 5 is an example showing arrangement angles of each of the layers for collimation using a linear polarization type reflecting polarization element (a2).

In a case where a linear polarization type reflection polarizer (a2) is employed, adopted is a retardation layer (b1) having retardation in the front direction of almost zero and a retardation of $\lambda/4$ or more relative to incident light incoming at an angle of 30° inclined from the normal direction. Linearly polarized light is converted to circularly polarized light using a structure in which the retardation layer (b1) is sandwiched between $\lambda/4$ plates (b2) each having a front retardation of about $\lambda/4$ and thereafter, the circularly polarized lights can be collimated by means of a similar way to that in the circular polarizing plate described above. A section of the structure and arrangement of layers thereof in this case are as shown in FIGS. 3, 4 and 5. In the case, an angle formed between the slow axis of a $\lambda/4$ plate (b2) and the polarization axis of a linear polarization type reflection polarizer (a2) is as described above and an angle between the axes of the $\lambda/4$ plates (b2) can be arbitrarily set.

To be concrete, a $\lambda/4$ plate is used as the retardation layer (b2). A $\lambda/4$ plate in use is a proper retardation plate adapted for a purpose of use. The $\lambda/4$ plate can control an optical characteristic such as a retardation in lamination of two or more kinds of retardation plates. Examples of retardation plates include: birefrengent films obtained by stretching films made of proper polymers such as polycarbonate, norbornene resin, polyvinyl alcohol, polystyrene, polymethylmethacrylate, polypropylene, other polyolefins, polyarylate, polyamide and others; alignment films each made of a liquid crystal material such as a liquid crystal polymer; alignment layers each made of a liquid crystal material supported by a film; and others.

A retardation plate functioning as a $\lambda/4$ plate in a broad wavelength range such as the visible light region can be obtained by a method in which, for example, a retardation layer functioning as a $\lambda/4$ plate for monochromatic light with a wavelength of 550 nm, a retardation layer exhibiting another retardation characteristic, for example a retardation layer functioning as a $\frac{1}{2}$ wavelength plate are superimposed one on the other, or the like method. Therefore, a retardation plate inserted between a polarizing plate and a brightness enhancement film may be made with one, or two or more retardation layers.

Figure 6:
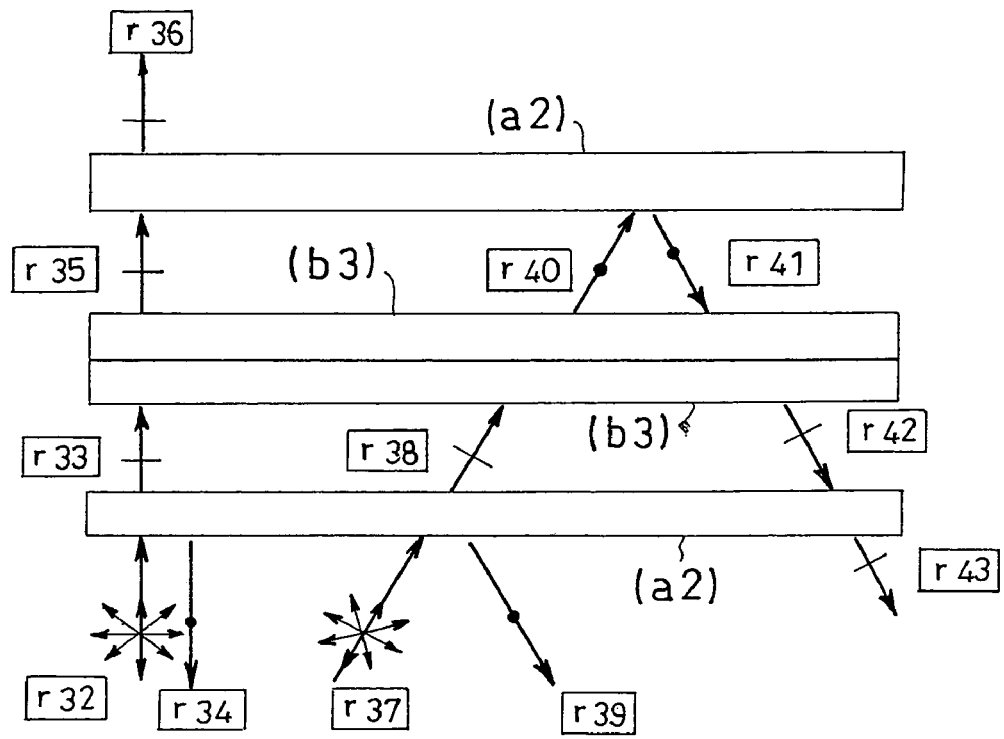
FIG. 6 is a conceptional representation showing an example of the fundamental principle for collimation of a polarization element (A).
Figure 7:
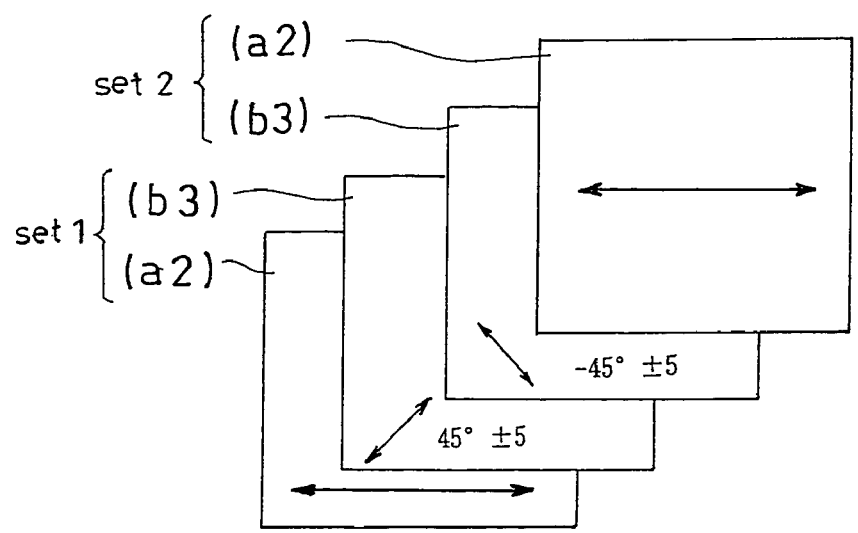
FIG. 7 is an example showing arrangement angles of each of the layers for collimation using a linear polarization type reflecting polarization element (a2).

A similar effect can be attained by disposing two biaxial retardation layers (b3) each having a front retardation of about $\lambda/4$ and a retardation in the thickness direction of $\lambda/2$ or more. A biaxial retardation layer (b3) with an Nz factor of about 2 or more satisfies the above described required condition. A section of the structure and arrangement of layers thereof in this case are as shown in FIGS. 6 and 7. In the case, a relationship between the slow axis of a biaxial retardation layer (b3) and the polarization axis of a linear polarization type reflection polarizer (a2) are as described above and an angle between the axes of biaxial retardation layers (b3) themselves can be set arbitrarily.

Note that a front retardation of about $\lambda/4$ means that the retardation is preferably on the order of $\lambda/4 \pm 40$ nm and more preferably on the order of $\lambda/4 \pm 15$ nm relative to light with a wavelength of 550 nm.

Figure 8:
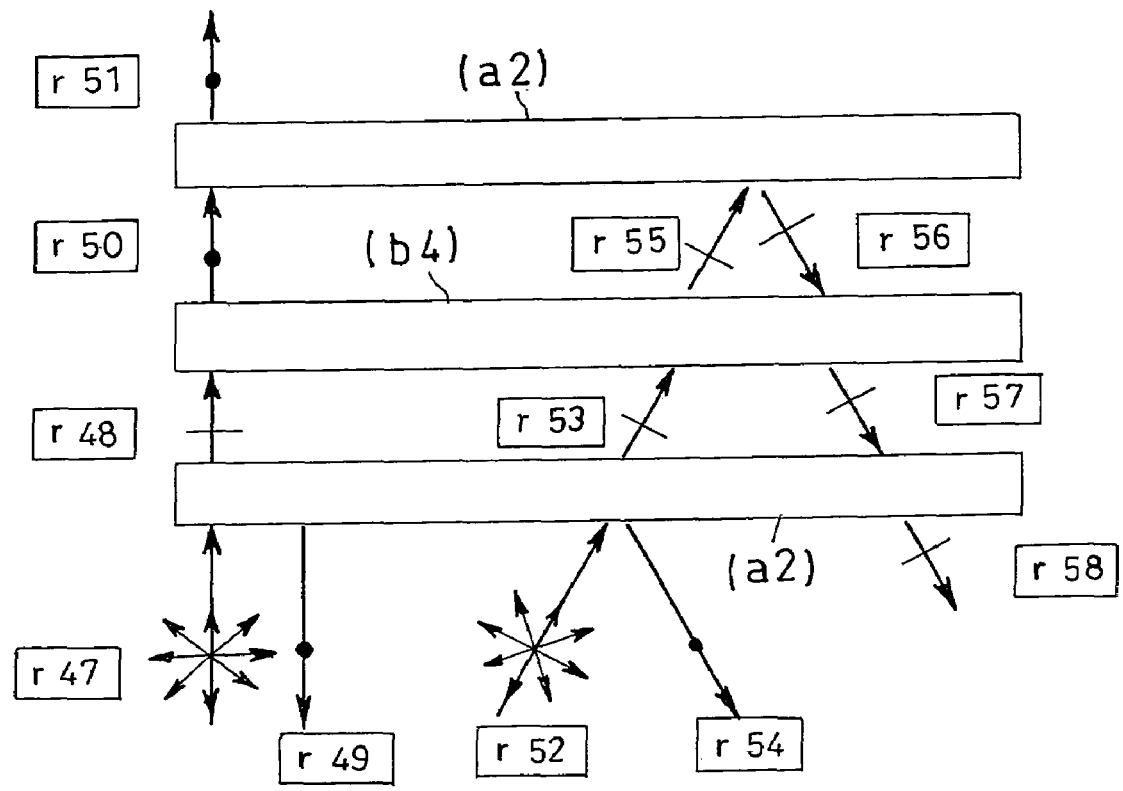
FIG. 8 is a conceptional representation showing an example of the fundamental principle for collimation of a polarization element (A).
Figure 9:
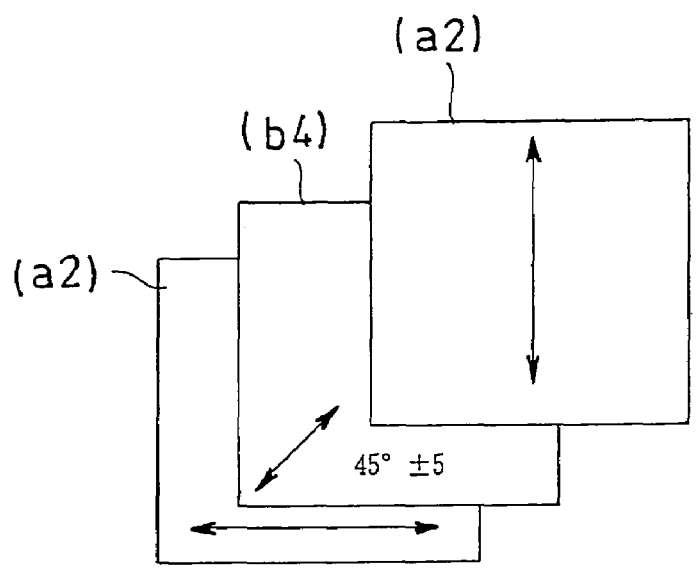
FIG. 9 is an example showing arrangement angles of each of the layers for collimation using a linear polarization type reflecting polarization element (a2).
Figure 10:
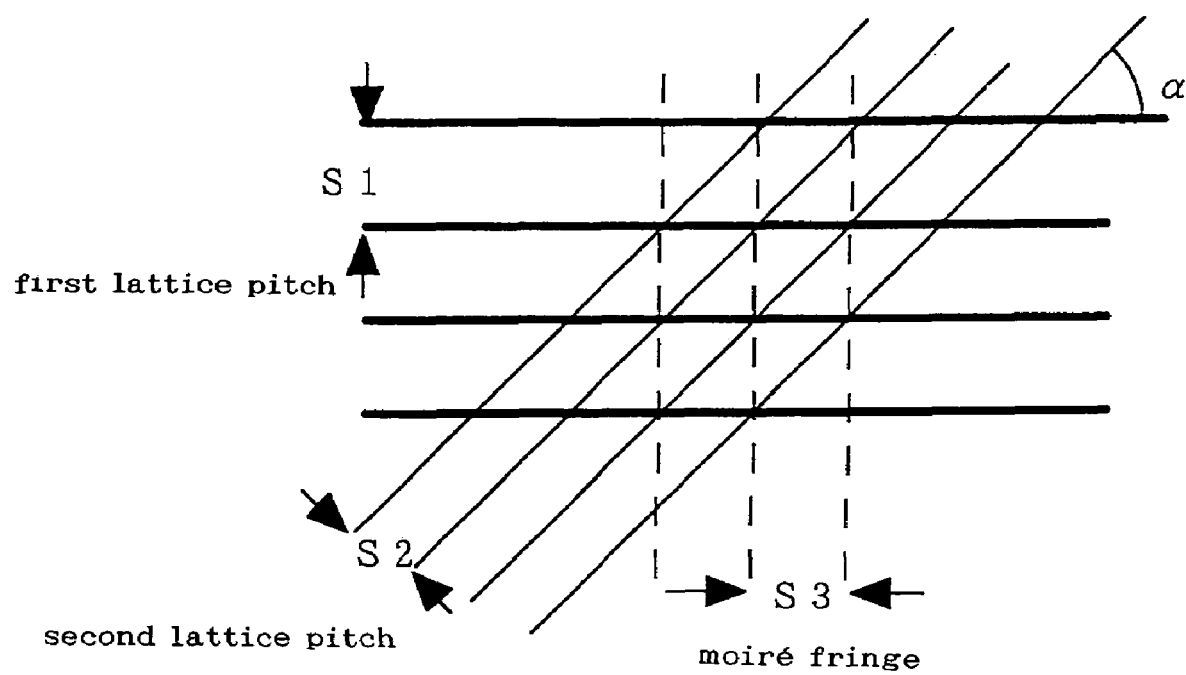
FIG. 10 is a conceptional representation showing a direct solution of a moiré.

A similar effect can also be obtained by using one biaxial retardation layer (b4) having a front retardation of about $\lambda/2$ and a retardation in the thickness direction of $\lambda/2$ or more. A biaxial retardation layer (b4) with an Nz factor of about 1.5 or more satisfies the above described required condition. A section of the structure and arrangement of layers thereof in this case are as shown in FIGS. 8 and 9. In the case, a relationship between the axes of the linear polarization type reflection polarizers (a2) one above the other and the axis of the biaxial retardation layer (b4) inserted in the middle assumes angles as designated and the angles are specially determined.

Note that a front retardation of about $\lambda/2$ means that the retardation is preferably on the order of $\lambda/2 \pm 40$ nm and more preferably on the order of $\lambda/2 \pm 15$ nm relative to light with a wavelength of 550 nm.

As the biaxial retardation layers (b3) and (b4), employed are, to be concrete, a layer obtained by biaxially stretching a plastic material having birefringence such as polycarbonate, polyethylene terephthalate or the like; and a layer obtained by uniaxially aligning a liquid crystal material in a plane direction and further aligning the liquid crystal material in the thickness direction so as to have hybrid alignment. A layer obtained by subjecting a liquid crystal material to uniaxial homeotropic alignment can be employed, which is formed by means of a method similar to the method used in film formation of the cholesteric liquid crystal. A necessity arises for use of a nematic liquid crystal material instead of a cholesteric liquid crystal material.

(Arrangement of Diffusing Reflection Plate (F))

A diffusing reflection plate (F) is desirably arranged on the lower side of a light guide plate (E) as a light source (the other side from an arrangement surface of a liquid cell). A main component of light reflected by a collimating film is an obliquely incident light component and the main component of light is specularly reflected and reflected back in the backlight direction. On this occasion, in a case where a reflection plate on the back surface side is high in specular reflection, a reflection angle is retained and cannot be emitted in the front direction only to end up with light loss. Therefore, a reflection angle of reflected-back light is not retained to thereby increase a scattering reflection component in the front direction; therefore the arrangement of a diffusing reflection plate (F) is desirable.

(Arrangement of Diffusion Plate (D))

It is also desirable to place a proper diffusion plate (D) between a collimating film in this invention and the backlight light source. This is because light impinging obliquely and reflected is scattered in the vicinity of a backlight guide plate and part of the reflected light is scattered in the vertical incidence direction to thereby enhance a reutilization of light.

A used diffusion plate (D) can be obtained by means of a method in which a surface irregularity in depressions and projections is utilized, or in which particles with different refractive indexes are embedded in a resin. The diffusion plate (D) either may be inserted between a collimating film and a backlight or may be laminated to a collimating film.

In a case where a liquid crystal cell to which a collimating film is laminated is placed in the near of a backlight, there is a possibility to cause a Newton ring in a clearance between a film surface and the backlight, while by placing a diffusion plate (D) having a surface irregularity in depressions and projections on the light guide plate side surface of the collimating film in this invention, it can be suppressed to generation of Newton ring. Moreover, a layer serving as a surface irregularity in depressions and projections and a light diffusing structure may be formed as a surface itself of a collimating film in this invention.

(Arrangement of View Angle Magnifying film (W))

Magnification of a viewing angle in a liquid crystal display of this invention can be achieved by obtaining a uniform and good display characteristic all over the viewing angle through diffusion of light of good display characteristic in the vicinity of the front obtained from a liquid crystal displays combined with a collimated backlight.

A viewing angle magnifying layer (W) used here is a diffusion plate having substantially no backscattering. A diffusion plate can be provided with a diffusion pressure-sensitive material. An arrangement place thereof can be used above or below a polarizing plate (PL) on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate (PL) and a liquid crystal cell (LC). In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying layer (W) is disposed outside of a polarizing plate (PL) on the viewer side of a liquid crystal cell (LC), a viewing angle compensating retardation plate may not be used especially if a TN liquid crystal cell is used since collimated lights are transmitted through a liquid crystal cell (LC) and through the polarizing plate (PL). If an STN liquid crystal cell is used in the case, it has only to use a retardation film that is well compensated with respect to a front characteristic. Since, in this case, a viewing angle magnifying layer (W) has a surface exposed to air, a type having a refractive effect due to a surface profile can also be employed.

On the other hand, in a case where a viewing angle magnifying film (W) is inserted between a polarizing plate (PL) and a liquid crystal cell (LC), light is diffused light at the stage where light is transmitted through the polarizing plate (PL). If a TN liquid crystal is used, a necessity arises for compensating a viewing angle characteristic of the polarizer itself. In this case, it is preferable to insert a retardation plate (C) to compensate a viewing angle characteristic of a polarizing plate (PL) between the polarizing plate (PL) and the viewing angle magnifying layer (W). If an STN liquid crystal is used, it is preferable to insert a retardation plate (C) to compensate a viewing angle characteristic of the polarizing plate (PL) in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying layer (W) or an arrangement sequence. Therefore, a viewing angle magnifying layer (W) has a lot of options since no specific limitation is imposed thereon, if neither interference nor a moiré pattern occurs with a pixel black matrix of a liquid crystal display.

In this invention, as viewing angle magnifying layers (W), preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moiré pattern occurs with a pixel black matrix of a liquid crystal display.

(Lamination of Layers)

Lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indexes closest possible to refractive indexes of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

As far as a reflection polarizer (a) and a retardation layer (b) used in a polarization element (A) in this invention satisfy the required conditions described above, it is possible to transmit light in the front direction with less of wavelength dependency but to cut off light in an oblique direction by reflection. A polarization element (A) in this invention has a feature that dependency on a characteristic of a light source is less as compared with a conventional technique, for example a collimation/light condensation system with combination of an interference filter and a bright-line emission light source, which is disclosed in the specification of USP No. 2002/36735 A.

(Other Materials)

Note that various other kinds of optical layers are properly employed according a common method to thereby, manufacture a liquid crystal display.

Polarizing plates (PL) are disposed on both sides of a liquid crystal cell. The polarizing plates (PL) disposed on both sides of the liquid crystal cell are arranged so that the polarization axes thereof are almost perpendicular to each other. The polarizing plate (PL) on the incidence side is arranged so that the polarization axis direction thereof is aligned with the axis direction of a linearly polarized light obtained by transmission from the light source.

Commonly used is a polarizing plate (PL) having a protective film on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned as a. Films made of heat curing type or ultraviolet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 µm or less, preferably 1 through 300 µm, and especially preferably 5 through 200 µm in viewpoint of strength, work handling and thin layer Moreover, it is preferable that the protective film may have as little coloring as possible. Accordingly, a protective film having a retardation value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

While a polarizing plate and a retardation plate described above can be formed by sequentially laminating layers one at a time in a manufacturing process for a liquid crystal display, an optical film such as an elliptic polarizing plate or the like obtained by lamination in advance has an advantage of being excellent in quality stability, workability in lamination and others and enabling a production efficiency of a liquid crystal display to be improved.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

In the polarizing plate mentioned above and the optical film in which at least one layer of the polarizing plate is laminated, an adhesive layer may also be prepared for adhesion with other members, such as a liquid crystal cell etc.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

EXAMPLES

Description will be given of the present invention showing examples, while this invention is not restricted to the examples shown below.

Note that as to a front retardation, a direction in which an in-plane refractive index is maximized is referred to as X axis, a direction perpendicular to the X axis as Y axis and the thickness direction of a film as Z axis, and refractive indexes in the axis directions as $nx$, $ny$ and $nz$, respectively; and from the refractive indexes $nx$, $ny$ and $nz$ at 550 nm measured with an automatic birefringence measuring instrument (manufactured by Oji Sceientific Instruments with a trade name of automatic birefringence meter KOBRA21ADH) and a thickness d (nm) of a retardation layer, a front retardation: $(nx-ny) \times d$, and a retardation in the thickness direction: $(nx-nz) \times d$ were calculated. Retardation when measured in an inclined state can be measured with the automatic birefringence measuring instrument. Inclination retardation is expressed by a value of $(nx-ny) \times d$ when being inclined.

Nz factor is defined with a formula: $Nz=(nx-nz)/(nx-ny)$.

Note that a reflectance spectrum was measured with a spectrophotometer (Instant multiphotometry system MCPD-2000, manufactured by Otsuka Electronics Co., Ltd.) and a reflection wavelength band is defined as a wavelength band having a half value of the maximum reflectance.

Other measuring instruments used in experiments are as follows:

Measurement on Haze was conducted with Haze meter HM150 manufactured by Murakami Color Research Laboratory.

Transmission/reflection spectral characteristics were measured with Spectrophotometer U4100 manufactured by Hitachi, Ltd.

A characteristic of a polarizing plate was measured with DOT3 manufactured by Murakami Color Research Laboratory.

Measurement on brightness was conducted with a brightness meter BM7 manufactured by TOPCON CORPORATION.

Illumination with ultraviolet was conducted with UVC321AMI manufactured by USHIO INC.

Example 1

(Preparation of Circular Polarization Type Reflection Polarizer (a1))

The circular polarization type reflection polarizer (a1) was prepared with a polymerizable nematic liquid crystal monomer and a chiral agent sold on the market. A used cholesteric liquid crystal was obtained from a mixture of a polymerizable mesogen compound and a polymerizable chiral agent, wherein LC242 manufactured by BASF Japan Ltd. was used as the polymerizable mesogen compound, and LC756 manufactured by BASF Japan Ltd. was used as the polymerizable chiral agent.

The polymerizable mesogen compound and the polymerizable chiral agent were mixed in a mixing ratio of 5 to 95 in weight ratio so that a central wavelength in selective reflection of an obtainable cholesteric liquid crystal was about 550 nm. The obtained cholesteric liquid crystal had a central wavelength in selective reflection was 545 nm and a selective reflection wavelength bandwidth was about 60 nm.

A detailed method was as follows: The polmerizable chiral agent and the polymerizable mesogen compound were dissolved (at 20 wt %) in cyclopentane and a reaction initiator (IRGACURE 907 manufactured by Ciba Specialty Chemicals. at 1 wt % relative to the mixture) was added to the mixture to prepare a solution. An alignment substrate in use was obtained by alignment treating a polyethylene terephthalate film: LUMIRROR (a thickness of 75 µm) manufactured by TORAY INDUSTRIES INC. with a rubbing cloth.

The solution was coated to a thickness of 5 µm as measured in a dry state with wire bar, the wet coat was dried at 90° C. for 2 min, thereafter heated temporarily to an isotropic transition temperature 130° C. and thereafter gradually cooled. A uniform alignment state was retained and the coat was cured by illumination with ultraviolet (at 10 mW/cm$^2$ for 1 min) in an environment at 80° C. to thereby obtain the circular polarization type reflection polarizer (a1). The obtained circular polarization type reflection polarizer (a1) was transferred onto a glass plate using a light transparent acrylic pressure-sensitive adhesive agent (manufactured by NITTO DENKO CORPORATION with No. 7 to a thickness of 25 µm). A selective reflection wavelength band of the obtained circular polarization type reflection polarizer (a1) ranged from about 520 to about 580 nm.

(Preparation of Negative C Plate)

Then, a retardation layer (b1: negative C plate) having a front retardation of almost 0 and a retardation of a value at an oblique direction was prepared with a polymerized liquid crystal. LC242 manufactured by BASF Japan Ltd. was used as a polymerizable mesogen compound and LC756 manufactured by BASF Japan Ltd. was used as a polymerizable chiral agent.

The polymerizable mesogen compound and the polymerizable chiral agent were mixed in a mixing ratio of 11 to 88 in weight ratio so that a central wavelength in selective reflection of an obtainable cholesteric liquid crystal was about 350 nm. The obtained cholesteric liquid crystal had a central wavelength in selective reflection was 350 nm.

A detailed method was as follows. The polymerizable chiral agent and the polymerizable mesogen compound were dissolved (at 30 wt %) in cyclopentane and a reaction initiator (IRGACURE 907 manufactured by Ciba Specialty Chemicals. at 1 wt % relative to the mixture) was added to the mixture to prepare a solution. An alignment substrate in use was obtained by alignment treating a polyethylene terephthalate film: LUMIRROR (a thickness of 75 µm) manufactured by TORAY INDUSTRIES INC. with a rubbing cloth.

The solution was coated to a thickness of 7 µm as measured in a dry state with wire bar, the wet coat was dried at 90° C. for 2 min, thereafter heated temporarily to an isotropic transition temperature 130° C. and thereafter gradually cooled. A uniform alignment state was retained and the coat was cured by illumination with ultraviolet (at 10 mW/cm$^2$ for 1 min) in an environment at 80° C. to thereby obtain the negative C plate (b1). The negative C plate (b1) was measured on a retardation thereof with the result that a retardation in the front direction was 2 nm and a retardation when being inclined by 30° was about 190 nm (>λ/8) for light with a wavelength of 550 nm.

(Preparation of Polarization Element (A) and a Backlight System Using Same)

The negative C plate (b1) was adhered to the top of the circular polarization type reflection polarizer (a1) obtained in the above described process with a light transparent acrylic pressure-sensitive adhesive agent (manufactured by NITTO DENKO CORPORATION with No. 7 to a thickness of 25 µm) and thereafter, the substrate was separated and removed off. The circular polarization type reflection polarizer (a1) was transferred and laminated thereon to thereby obtain the polarization element (A) of this invention. Since this sample does not cover the entire visible light region because of a narrow band thereof, a collimation effect was confirmed with a monochromatic light source.

A green diffusion light source having a bright-line at 544 nm was provided to the obtained polarization element (A). As to the light source, GO type manufactured by Elevam Corp. as a cold cathode fluorescent lamp was placed in a dot printing side light type backlight unit (E) manufactured by Chatani Kogyo K.K. and a light diffusing plate (D manufactured by Kimoto Co., Ltd. with a haze of 90% or more) was inserted between the light source and the polarization element (A), which was used as a diffusing light source. A diffusing reflection plate (F) obtained by evaporating with silver on a matt PET was disposed on the lower surface of the backlight.

It was confirmed that the polarization element (A) placed on the diffusion light source emits lights in the normal direction, while transmitted light started sudden decrease at an angle of the order of 20° in an oblique direction, decreased by half at 30° in an oblique direction and emitted light came to almost nothing at about 45° in an oblique direction.

(Manufacture of Viewing Angle Magnification Liquid Crystal Display)

Then, a TN liquid crystal cell (LC) sold on the market was provided to a monochromatic light source backlight using the polarization element (A). A TFT liquid crystal cell (with 10.4-inch diagonal screen) manufactured by TOSHIBA CORP. without a retardation film for viewing angle correction was used as the TN liquid crystal. The polarizing plates (PL) one above the other were used adhering SEG1425DU manufactured by NITTO DENKO CORPORATION as replacement thereto.

A λ/4 plate (an NRF film manufactured by NITTO DENKO CORPORATION with a front retardation of 140 nm) as a retardation layer (B) was disposed on the previously prepared light condensing backlight. The polarizing plate (PL) on the lower surface of the liquid cell was arranged so that the polarization axis direction thereof forms an angle of 45° relative to the slow axis of the retardation layer (B), and the back surface of the liquid crystal cell (LC), the polarizing plate (PL), the λ/4 plate (B) and the polarization element (A) were adhered to one another with a light transparent acrylic pressure-sensitive adhesive agent (manufactured by NITTO DENKO CORPORATION with No. 7 to a thickness of 25 μm) in arrangement in which a front transmitted light amount was maximized.

Moreover, a light diffusion pressure-sensitive adhesive layer with a Haze of 92% as a viewing angle magnifying layer (W) was prepared by dispersing true spherical silica particles (with a particle size of 4 μm, a mixing content of 30 wt % and a refractive index of 1.44) in a light transparent acrylic pressure-sensitive adhesive agent (No. 7 with a refractive index of 1.47 manufactured by NITTO DENKO CORPORATION). A thickness thereof was about 30 μm. The light diffusion pressure-sensitive adhesive layer was adhered between the polarizing plate (PL) on the front surface side of the liquid crystal display and the liquid crystal cell (LC).

Figure 11:
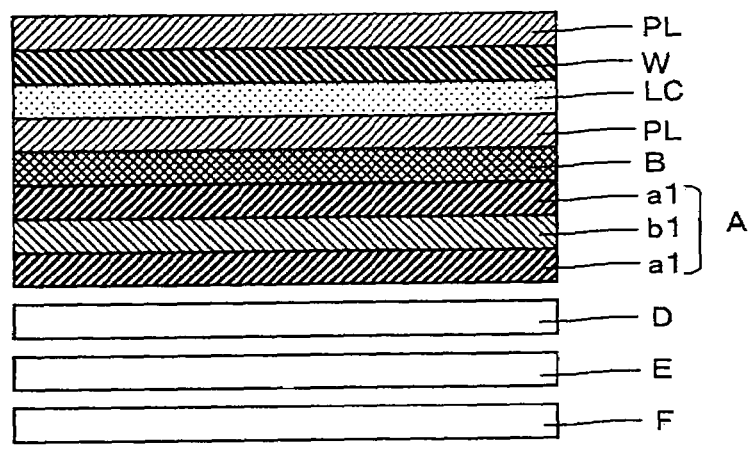
FIG. 11 is a conceptional view of a viewing angle magnification liquid crystal display of a first embodiment.

The obtained viewing angle magnification liquid crystal display is as shown in FIG. 11. The viewing angle magnification liquid crystal display does not cause gray scale inversion within ±60° of an inclination angle relative to the normal direction and maintains a good display characteristic in a viewing angle characteristic in a gray scale representation. Since the viewing angle magnifying layer (W) was inserted between the polarizing plate (PL) and the liquid crystal cell (LC), light transmitted in the direction normal to the liquid crystal cell (LC) is not influenced of the viewing angle characteristic of the liquid crystal, while being some influenced of the viewing angle characteristic of the polarizing plate (PL). A characteristic of the liquid crystal display of this invention was improved as compared with a conventional liquid crystal display without adopting a combination of the collimating light source and the viewing angle magnifying layer (W) in this invention.

Example 2

(Preparation of Positive C Plate)

A retardation layer (b1 as a positive C plate) having a front retardation of O and a retardation in an oblique direction of a value was prepared with a polymerized liquid crystal. Used as a polymerizable liquid crystal compound was a polymerizable nematic liquid crystal monomer A expressed by the following chemical formula 1:

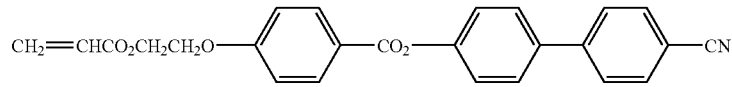

A detailed method was as follows. The polymerizable nematic liquid crystal monomer A was dissolved in cyclopentane (at 30 wt %) and a reaction initiator (IRGACURE 907 manufactured by Ciba Specialty Chemicals. at 1 wt % relative to the monomer A) was added to the monomer A to prepare a solution. An vertical alignment film in use was formed by coating a cyclohexane solution (at 0.1 wt %) of a release agent (octadecyltrimethoxysilane) on a polyethylene terephthalate film: LUMIRROR (a thickness of 75 μm) manufactured by TORAY INDUSTRIES INC. to dry the coat.

The polymerizable nematic liquid crystal monomer A solution was coated with a wire bar to a thickness of 2.5 μm as measured in a dry state, the wet coat was dried at 90° C. for 2 min, thereafter heated temporarily to an isotropic transition temperature of 130° C. and thereafter gradually cooled. A uniform alignment state was retained and the coat was cured by illumination with ultraviolet (at 10 mW/cm² for 1 min) in an environment at 80° C. to thereby obtain the positive C plate (b1). The positive C plate (b1) was measured on a retardation thereof with the result that a retardation in the front direction was 0 nm and a retardation when being inclined by 30° was about 200 nm (>λ/8) for light with a wavelength of 550 nm.

(Preparation of Polarization Element (A))

The polarizing element A was obtained in a procedure in conformity with Example 1 with the exception that in Example 1, the positive C plate (b1) was used instead of the negative C plate (b1).

(Manufacture of Viewing Angle Magnification Liquid Crystal Display)

Figure 12:
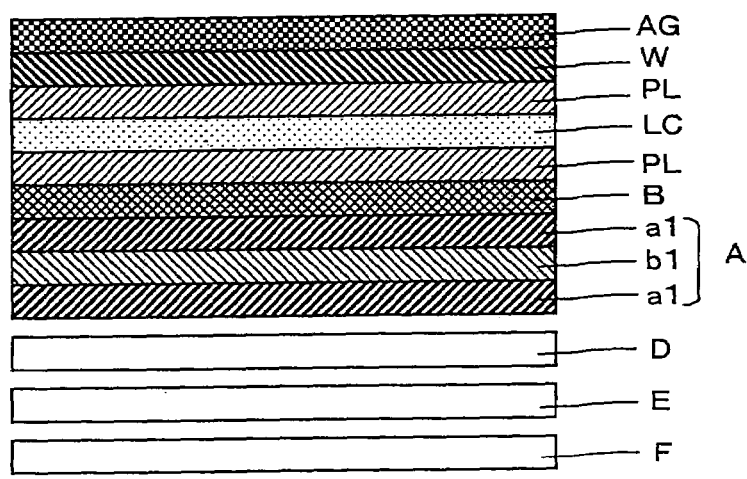
FIG. 12 is a conceptional view of a viewing angle magnification liquid crystal display of a second embodiment.

The viewing angle magnifying system was assembled using the obtained polarization element (A), the liquid crystal display and the light source same as in Example 1. A diffusion pressure-sensitive adhesive layer, which is a viewing angle magnifying layer (W), was adhered on the polarizing plate (PL) as the upper plate of the liquid crystal display and an anti-glare treated triacetyl cellulose film (AG, a 80 μm TAC film with AGS1 manufactured by NITTO DENKO CORPORATION) was adhered thereonto. The obtained viewing angle magnification liquid crystal display is as shown in FIG. 12. A characteristic was almost of a performance equal to that of Example 1. Since in Example 2, the viewing angle magnifying layer (W) was disposed on the polarizing plate (PL), an influence of a viewing angle characteristic of the polarizing plate (PL) was not exerted more as compared with Example 1, while backscattering of external light (incident light, such as solar light or indoor illumination) occurred, which reduced contrast slightly. A viewing angle characteristic was, however, more excellent than in a conventional liquid crystal display.

Example 3

(Preparation of Linear Polarization Type Reflection Polarizer (a2))

A multilayer film with 20 layers was obtained by alternately controlling thicknesses of thin films with a feed block method so that polyethylene naphthalate (PEN)/naphthalene dicarboxylate-terephthalate copolyester (co-PEN) were alternately laminated. The multilayer film was uniaxially stretched. A stretching temperature was about 140° C. and a stretch ratio was about threefold in the TD direction. A thickness of each of thin layers in the obtained stretched film was roughly on the order of 0.1 μm. Five stretched films of the obtained 20 layer laminate films were further laminated into a five composite layer laminate including 100 layers in total, thereby obtaining the linear polarization type reflection polarizer (a2). The linear polarization type reflection polarizer (a2) had a reflection function exerted on linearly polarized light in a wavelength band of 500 nm or more and 600 nm or less.

(Preparation of Polarization Element (A))

Disposed as the retardation layer (b2) on both sides of the negative C plate (b1) obtained in Example 1 were λ/4 plates made of a uniaxially stretched polycarbonate film (a NRF film having a front retardation of 135 nm, manufactured by NITTO DENKO CORPORATION). The linear polarization type reflection polarizer (a2) were arranged outside of the λ/4 plates so that arrangement of the axes of FIG. 5 was established to thereby obtain the polarization element (A). That is, arrangement was conducted in the following order in a case where the transmission axis of a linear polarization type reflection polarizer (a2) obtained in the process described above on the incidence side was set at 0°: the linear polarization type reflection polarizer (a2), a λ/4 plate (b2) with the axis set at 45°, a C plate (b1) having no axis direction, a λ/4 plate (b2) with the axis set at −45° and a linear polarization type reflection polarizer (a2) obtained in the process described above on the emission side with the transmission axis set at 90°. The layers were laminated with a light transparent acrylic pressure-sensitive adhesive agent (manufactured by NITTO DENKO CORPORATION with No. 7 to a thickness of 25 μm). The substrate of the negative C plate (b1) was removed when being used, similar to Example 1.

(Manufacture of Viewing Angle Magnification Liquid Crystal Display)

The viewing angle magnifying system was assembled using the obtained polarization element (A), the liquid crystal display and the light source same as in Example 1. A polarizing viewing angle compensating retardation plate (a biaxially stretched retardation plate made of a 80 μm TAC film, manufactured by Fuji Photo Film Co., Ltd.), as a retardation layer (C), was inserted between a polarizing plate (PL) and a viewing angle magnifying layer (W). This is because since light transmitted through a liquid cell (LC) in a direction nearly normal thereto is diffused in the viewing angle magnifying layer (W) and thereafter impinges on the polarizing plate (PL), a viewing angle characteristic of the polarizing plate (PL) is prevented from being revealed, wherein a viewing angle characteristic of the liquid crystal cell (LC) is not revealed. Note that no λ/4 plate (B) was inserted between the polarizing plate (PL) and the polarization element (A).

Figure 13:
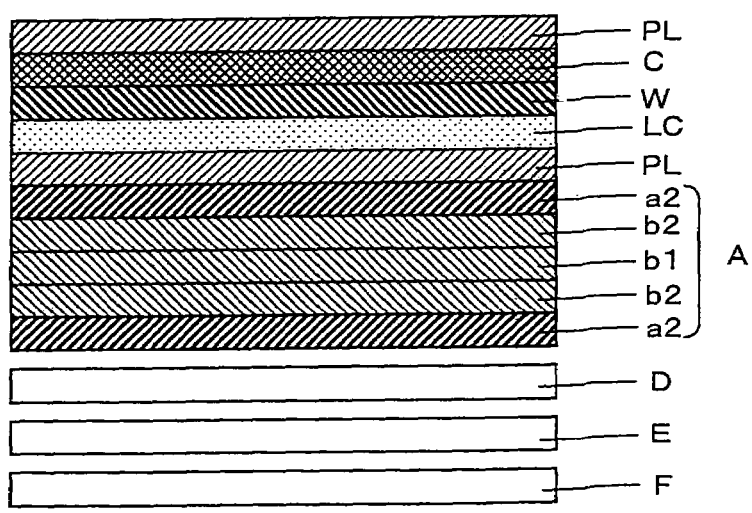
FIG. 13 is a conceptional view of a viewing angle magnification liquid crystal display of a third embodiment.

The obtained viewing angle magnification liquid crystal display is as shown in FIG. 13. A characteristic thereof was almost of a performance equal to that of Example 1 with an improved characteristic of the polarizing plate itself in a viewing angle deficient region in the axis direction thereof (in a direction of ±45° obliquely inclined when viewed from the front of the screen).

Example 4

(Preparation of Polarization Element (A))

A retardation film (with a front retardation of 270 m and a Nz factor of 1.5) obtained by biaxially stretching a polycarbonate film, as a retardation layer (b4), was adhered between two linear polarization type reflection polarizers (a2), obtained in Example 3, with arrangement of the respective transmission axes thereof perpendicular to each other in conformity to FIG. 9 to thereby prepare the polariziation element (A). The retardation film was prepared by biaxially stretching an unstretched polycarbonate film manufactured by Kaneka Corp. with a biaxial stretching machine. A light transparent acrylic pressure-sensitive adhesive agent (manufactured by NITTO DENKO CORPORATION with No. 7 to a thickness of 25 μm) was employed in adherence of layers therebetween.

(Manufacture of Viewing Angle Magnification Liquid Crystal Display)

A backlight system was manufactured using the obtained polarization element (A) in similar way to that in Example 1.

Then, a color STN liquid crystal (with 10.4 in), as a liquid crystal cell (LC), was disposed on a monochromatic light source backlight using the polarization element (A). Polarizing plates (PL) one above the other were used adhering to SEG1425DU manufactured by NITTO DENKO CORPORATION as replacement thereto. An STN compensation retardation plate (an NRF film, made of a polycarbonate, manufactured by NITTO DENKO CORPORATION with a front retardation of 430 nm and a thickness of 50 μm using a pressure-sensitive adhesive agent layer to a thickness of 25 μm thereon) as a retardation layer (C) was inserted between the liquid crystal cell (LC) and the polarizing plate (PL). A microlens array sheet with a surface profile as a viewing angle magnifying layer (W) (corresponding to a Haze of 90% with a lens pitch of about 20 μm) was disposed on the polarizing plate (PL) on the front surface side thereof. The layers were adhered to one another with a light transparent acrylic pressure-sensitive adhesive agent (manufactured by NITTO DENKO CORPORATION with No. 7 to a thickness of 25 μm).

Figure 14:
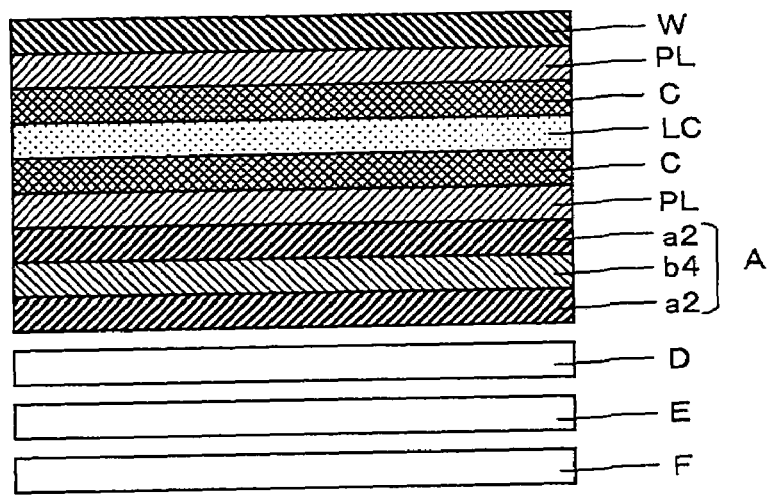
FIG. 14 is a conceptional view of a viewing angle magnification liquid crystal display of a fourth embodiment.

The obtained viewing angle magnification liquid crystal display is as shown in FIG. 14. The viewing angle magnification liquid crystal display has a front maximum contrast of the liquid crystal display as a base as low as a value of the order of about 20, but without a gray scale inversion, which is similar to Example 1, and a practical range of viewing angles was wide.

Example 5

(Preparation of Circular Polarization Type Reflection Polarizer (a1))

A coating liquid containing cholesteric liquid crystal polymers for use in four layers with respective different selective reflection central wavelengths and a solvent was coated on a rubbing treated surface of a triacetyl cellulose film subjected to a rubbing treatment after a polyimide alignment film was provided in advance to thereby obtain the broad band circular polarization type reflection polarizer (a1). The used liquid crystal material was prepared based on the specification of EP No. 0834754 A to obtain four kinds of cholesteric liquid crystal polymers with respective selective reflection central wavelengths of 460 nm, 510 nm, 580 nm and 660 nm.

A cholesteric liquid crystal polymer was prepared by polymerizing a polymerizable nematic liquid crystal monomer A expressed by the following chemical formula 2:

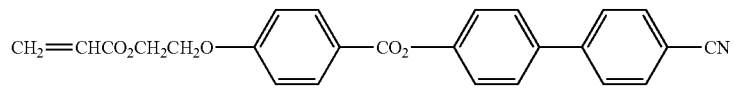

and a polymerizable chiral agent B expressed by the following chemical formula 3:

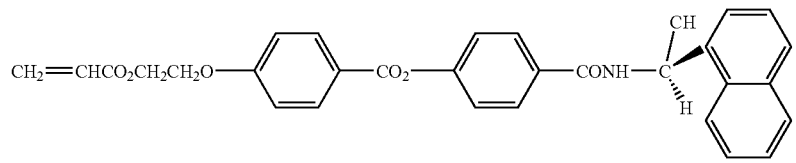

in a liquid crystal mixture with each of proportions (in weight ratios) shown in the following Table 1. Each of the liquid crystal mixtures was dissolved in a tetrahydrofuran to obtain a 33 wt % solution, thereafter nitrogen purge was conducted in an environment at 60° C. and then a reaction initiator (azobisisobutylnitrile at 0.5 wt % relative to the mixture) was added to the mixture to thereby cause polymerization. An obtained polymerized material was reprecipitation-separated with diethyl ether for purification. Selective reflection wavelength bands are shown in Table 1.

TABLE 1

| Selective reflection central wavelength (nm) | (Mixing ratio) monomer A/chiral agent B | Selective reflection wavelength band (nm) |
|---|---|---|
| 460 nm | 9.2/1 | 430 to 490 nm |
| 510 nm | 10.7/1 | 480 to 550 nm |
| 580 nm | 12.8/1 | 540 to 620 nm |
| 660 nm | 14.9/1 | 620 to 710 nm |

Each of the cholesteric liquid crystal polymers were dissolved in methylene chloride to prepare a 10 wt % solution. The solution was coated on an alignment base material with a wire bar to a thickness of about 1.5 µm when measured in a dry state. Used as the alignment base material was a triacetyl cellulose film with a thickness of 80 µm (manufactured by Fuji Photo Film Co., Ltd. with a trade name of TD-TAC) and a polyimide layer was coated on a surface thereof to a thickness of about 0.1 µm, followed by a rubbing treatment with a rayon rubbing cloth. After the coating, the wet coat was dried at 140° C. for 15 min. After the heat treatment ended, the liquid crystal was cooled to room temperature and fixed at the temperature to obtain a thin film.

Liquid crystal thin films in colors were prepared using the respective cholesteric liquid crystal polymers subjecting to a process similar to that as described above and thereafter, adhered to one another with a transparent isocyanate adhesive agent AD244 (manufactured by Tokushiki Co., Ltd.). The liquid crystal thin films in R and G colors were adhered to each other and then a triacetyl cellulose substrate on the G side was separated off. In a similar way, after the liquid crystal thin films in B and G colors were adhered to each other and then a triacetyl cellulose substrate on the R side was separated off. By doing so, there was obtained a cholesteric liquid crystal composite layer with a thickness of about 10 µm in a structure in which the four liquid crystal layers were laminated sequentially staring at the shorter wavelength side. The circular polarization type reflection polarizer (a1) made of the obtained cholesteric liquid crystal composite layer had a selective reflection function in the range of from 430 nm to 710 nm.

(Preparation of Polariziation Element (A) and Backlight System Using Same)

The obtained circular polarization type reflection polarizers (a1) were adhered on both sides of the negative C plate (b1) prepared in Example 1 with a light transparent acrylic pressure-sensitive adhesive agent (manufactured by NITTO DENKO CORPORATION with No. 7 to a thickness of 25 µm) to thereby obtain the polarization element (A). The circular polarization type reflection polarizers (a1) one above the other in use were of the same rotational sense of circular polarization.

The obtained polarization element (A) was disposed on a direct-under type backlight (D) manufactured by Tama Denki kogyo K.K using a cold cathode fluorescent lamp with bright-lines at three wavelengths (of 435 nm, 545 nm and 610 nm). In this case as well, while light was emitted in the normal direction, transmitted light was suddenly reduced at an oblique angle of 20° or more, decreases by half at about 30° and was reduced at about 45° to as low as 10% relative to a front brightness. Since the polarization element (A) was adapted for all the visible light region, light in all the visible light region was transmitted only in the front direction, while functioning as a light condensing element through which no light is transmitted in an oblique direction.

(Manufacture of Viewing Angle Magnification Liquid Crystal Display)

Figure 15:
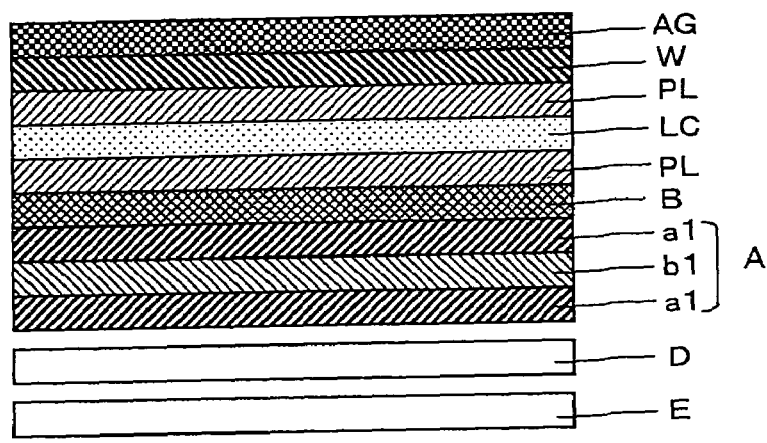
FIG. 15 is a conceptional view of a viewing angle magnification liquid crystal display of a fifth embodiment.

The viewing angle magnification liquid crystal display was obtained by superimposing a laminate equal to that of the liquid crystal cell (LC) and the viewing angle magnifying layer (W) same as in Example 2 using the obtained backlight system. The obtained viewing angle magnification liquid crystal display is as shown in FIG. 15.

Example 6

(Preparation of Polarization Element (A) and Backlight System Using Same)

Used as a linear polarization type reflection polarizer (a2) was DBEF manufactured by 3M Corp. Retardation layers obtained by biaxially stretching a polycarbonate film (having a front retardation of 140 nm and an Nz factor of 2), as retardation layers (b3), were adhered to the linear polarization type reflection polarizer (a2) in a way in conformity with FIGS. 6 and 7 to thereby prepare the polarization element (A). The retardation film was prepared by stretching and aligning an unstretched polycarbonate film manufactured by Kaneka Corp. with a biaxial stretching machine. The layers were laminated with a light transparent acrylic pressure-sensitive adhesive agent (manufactured by NITTO DENKO CORPORATION with No. 7 to a thickness of 25 µm).

A light diffusing plate (D, manufactured by Kimoto Co., Ltd. with a Haze of about 90%) was disposed on a side light type backlight (E, manufactured by Stanley electric Co., Ltd.) using a cold cathode fluorescent lamp with bright-lines at three wavelengths (of 435 nm, 545 nm and 610 nm) as a light source unit and a polarization element (A) was disposed thereon. A diffusing reflection plate (F) obtained by evaporating silver on a matt PET was disposed on the lower surface of the backlight.

(Manufacture of Viewing Angle Magnification Liquid Crystal Display)

Figure 16:
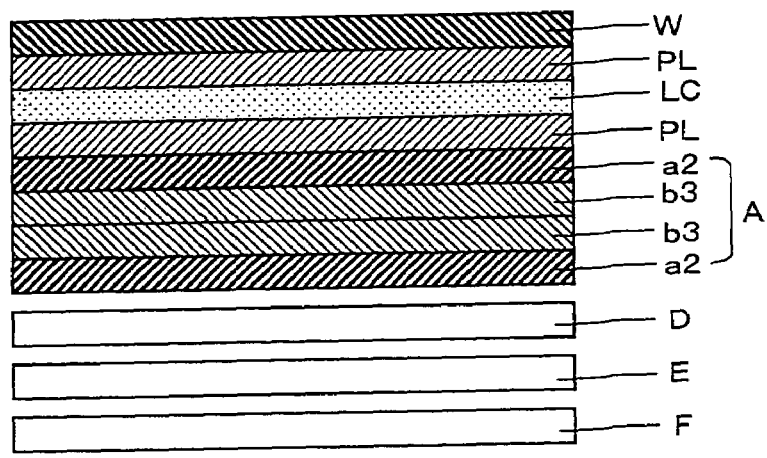
FIG. 16 is a conceptional view of a viewing angle magnification liquid crystal display of a sixth embodiment.

The viewing angle magnification liquid crystal display shown in FIG. 16 was manufactured using the obtained backlight system. Used as a liquid crystal cell (LC) was a color TFT liquid crystal (10.4 in) manufactured by TOSHIBA CORP. Used as a viewing angle magnifying layer (W) was a microlens array sheet with a surface profile. Used as a polarizing plate (PL) was SEG1425DU manufactured by NITTO DENKO CORPORATION The microlens array sheet corresponds to a Haze of 90. A lens pitch was about 20 µm and prepared by transfer formation from a brass made metal die cut product. A base material film was a clear TAC film with 50 µm manufactured by Fuji Photo Film Co., Ltd. A form transferring resin was an ultraviolet polymerizable epoxy resin (manufactured by ASAHI DENKA CO., LTD. with a trade name of KR410) and after a metal die was release-treated with a silicone resin, the epoxy resin was dropwise applied. The epoxy resin was uniformly spread all the surface with a glass rod and then a base material film was adhered thereto and a form obtained by ultraviolet polymerization (at 10 mW for 30 sec) was transferred on the film. The form transferred film was adhered to the surface of the polarizing plate (PL) on the upper side of FIG. 16 with the base material film placed on the polarizing plate (PL) side and the form transferred surface with irregularity of depressions and projections exposed to the air. The obtained viewing angle magnification liquid crystal display had no gray scale inversion observed in the range within ±60° from the front.

Though in the system, interference occurs between the viewing angle magnifying microlens array and a black matrix of the liquid crystal display to produce a moiré, the moiré can be alleviated by inclining an adherence angle of the microlens array by 45°. No interference occurred, in this case, with the polarization element including the reflection polarizer.

Example 7

(Preparation of Polarization Element (A))

Figure 17:
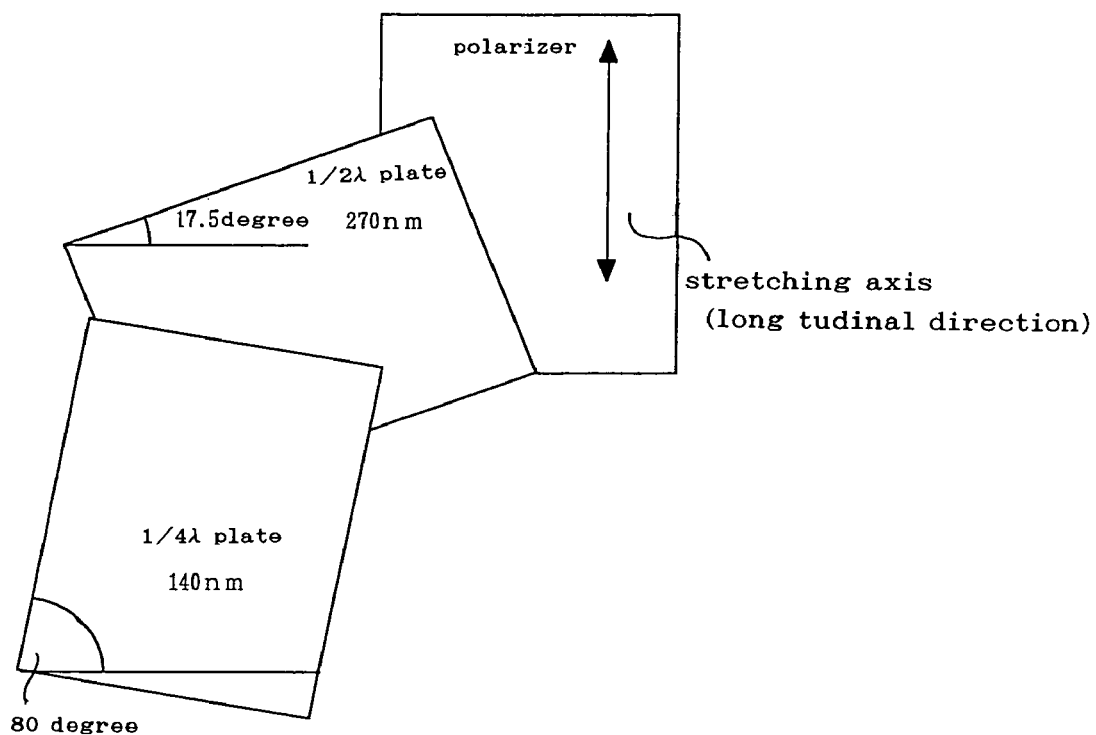
FIG. 17 is a conceptional diagram showing a relationship between axes on laminated layers of a two layer broad band λ/4 retardation plates (b2) with respective different axes in a seventh embodiment.

DBEF manufactured by 3M Corp. were employed as linear polarization type reflection polarizers (a2). Disposed on both sides of the negative C plate were (b1) the broad band λ/4 retardation plates obtained by laminating two uniaxially stretched films made of a polycarbonate with respective different axes as retardation layers (b2) (a laminate including an NRF film manufactured by NITTO DENKO CORPORATION with a front retardation of 140 nm and an NRZ film manufactured by NITTO DENKO CORPORATION with a front retardation of 270 nm and an Nz factor of 0.5). A relationship between axes of the broad band λ/4 retardation plates (b2) is shown in FIG. 17. This is because since the linear polarization type reflection polarizers (a2) are of a broad band to cover the entire visible light region, wavelength characteristics of light condensation and collimation are matched with each other and a difference in reflectance according to a wavelength of reflected light from incident light in an oblique direction is suppressed. With such a construction adopted, when emitted light is reduced in an oblique direction, a difference in light reduction percentage according to a color is reduced, thereby enabling a change in tone to be smaller and lights to be confined.

The linear polarization type reflection polarizers (a2) were disposed on the outsides of the broad band λ/4 retardation plates so as to assume arrangement of the axes of FIG. 5 to thereby obtain the polarization element (A). That is, arrangement was conducted in the following order in a case where the transmission axis of a linear polarization type reflection polarizer (a2) on the incidence side was set at 0°, the linear polarization type reflection polarizer (a2), a λ/4 plate (b2) with the axis set at 45°, a C plate (b1) having no axis direction, a λ/4 plate (b2) with the axis set at −45° and a linear polarization type reflection polarizer (a2) on the emission side with the transmission axis set at 90°. The layers were laminated with a light transparent acrylic pressure-sensitive adhesive agent (manufactured by NITTO DENKO CORPORATION with No. 7 to a thickness of 25 µm). The base material of the negative C plate (b1) was removed when being used, which is similar to Example 1.

(Manufacture of Viewing Angle Magnification Liquid Crystal Display)

Figure 18:
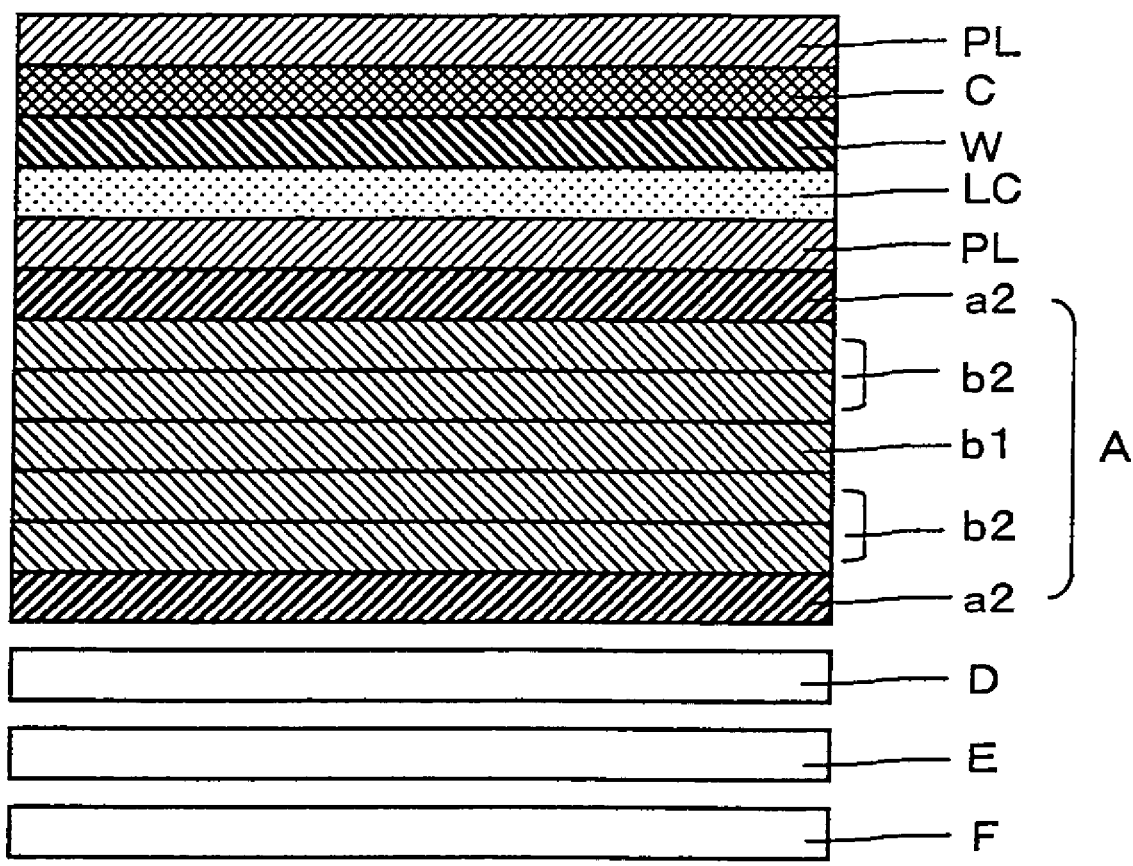
FIG. 18 is a conceptional view of a viewing angle magnification liquid crystal display of the seventh embodiment.

A viewing angle magnifying system was assembled, similar to that in Example 1, using the obtained polarization element (A). The obtained viewing angle magnification liquid crystal display is as shown in FIG. 18. A hologram diffusion plate, however, was disposed as a viewing angle magnifying layer (W). Adopted as a backlight was a side light type backlight (E) manufactured by Stanley Electric Co., Ltd. using a cold cathode fluorescent lamp of a three wavelength type (adapted for 435 nm, 545 nm and 610 nm). A diffusion plate (with a Haze of about 90) was employed in combination. A TFT liquid crystal cell (11.3 in) manufactured by Sharp Corp. was employed as a liquid crystal cell (LC).

A characteristic thereof was almost of a performance equal to that of Example 1 with an improved characteristic of the polarizing plate itself in a viewing angle deficient region in the axis direction thereof (in a direction of ±45° obliquely inclined when viewed from the front of the screen).

Comparative Example 1

A polarization element (A) including reflection polarizers (a) and retardation plates (b) was removed each of the viewing angle magnification liquid crystal displays of Examples 1 to 7. While in any liquid crystal display, a viewing angle characteristic was made uniform by a diffusion effect of the viewing angle magnifying layer (W), uniformity was realized including light in a region where a gray scale is inverted; therefore, a brightness in black display was improved to thereby reduce a contrast.

Even if uniformity is realized in the regions outside the range of inclination angles within ±45° from the normal direction, which region is where a gray scale is inverted, only an averaged image in which a gray scale is inverted is obtained. Therefore, no effect of a viewing angle magnifying layer (W) was observed and a gray scale was inverted, thereby having recognized an unnatural change in darkness and brightness pattern in gray scale representation.

Comparative Example 2

In Example 6, a light control film manufactured by 3M Corp. was employed instead of the polarization element (A) to obtain collimated light source. Interference occurs, however, between a microlens array and a black matrix of pixels of the liquid crystal display and a moiré was visually recognized. Therefore, while reduction in the pattern was tried by rotating the microlens array, the rotation caused a moiré between the microlens array and a pitch in the light control roll film only to fail in erasure of both patterns.

Comparative Example 3

A polarization element was prepared with a combination similar to that in Example 3 with the exception that an iodine containing absorption dichroic polarizer sold on the market (manufactured by NITTO DENKO CORPORATION with a trade name of NPF-EG1425DU) was employed instead of the linear polarization type reflection polarizer (a2). A viewing angle magnification liquid crystal display similar to that in Example 1 was manufactured using the polarization element. While obtained were a transmission characteristic in the front direction and an effect of restricting a viewing angle caused by an absorption characteristic in an oblique direction, an absorption loss is great and a brightness of the front is not improved, thereby obtaining only an extremely dark display.

INDUSTRIAL APPLICABILITY

A viewing angle magnification liquid crystal display of the present invention is of a thin type and capable of realizing a wide viewing angle.

The invention claimed is:

1. A viewing angle magnification liquid crystal display comprising at least:
a backlight system containing a polarization element (A) wherein said polarization element (A) comprises a retardation layer (b) and a reflection polarizer (a), wherein said reflection polarization (a) comprises at least two layers and said retardation layer (b) is disposed between said at least two layers, and said reflection polarizer (a) has respective selective reflection wavelength bands of polarized light superimposed on each other to conduct collimation for a diffusion light source;
a liquid crystal cell transmitting collimated lights;
polarizing plates disposed on both sides of the liquid crystal cell; and
a viewing angle magnifying layer disposed on the viewer side of the liquid crystal cell to diffuse transmitted light, wherein
the reflection polarizer (a) is a circular polarization type reflection polarizer (a1) transmitting circularly polarized light but selectively reflecting reverse circularly polarized light, and
the retardation layer (b) comprises a layer (b1) having a front retardation of almost zero and a retardation of $\lambda/8$ or more relative to incident light incoming at a direction inclined from the normal direction by 30° or more.

2. The viewing angle magnification liquid crystal display according to claim 1, wherein
the selective reflection wavelengths of the at least two layers of the reflection polarizer (a) are superimposed on each other in the wavelength range of 550 nm±10 nm.

3. The viewing angle magnification liquid crystal display according to claim 1, wherein
the retardation layer (b1) is of a cholesteric liquid crystal phase, having a selective reflection wavelength band in a region outside the visible light region, and fixed in a planar alignment state.

4. The viewing angle magnification liquid crystal display according to claim 1, wherein
the retardation layer (b1) is of a rod-like liquid crystal fixed in a homeotropic alignment state.

5. The viewing angle magnification liquid crystal display according to claim 1, wherein
the retardation layer (b1) is of a discotic liquid crystal fixed in an alignment state of a nematic phase or a columnar phase.

6. The viewing angle magnification liquid crystal display according to claim 1, wherein
the retardation layer (b1) is a biaxially aligned polymer film.

7. The viewing angle magnification liquid crystal display according to claim 1, wherein
the retardation layer (b1) is of an inorganic layered compound with a negative uniaxiality fixed in an alignment state so that the normal direction of a surface of the compound is an optical axis.

8. The viewing angle magnification liquid crystal display according to claim 1, wherein
the circular polarization type reflection polarizer (a1) comprises a cholesteric liquid crystal.

9. The viewing angle magnification liquid crystal display according to claim 1, wherein
a $\lambda/4$ plate is disposed on the viewer side of the circular polarization type reflection polarizer (a1), and an axis direction of a linearly polarized light obtained by transmission and a transmission axis direction of a polarizing plate on the lower surface side of the liquid crystal display are disposed in alignment with each other.

10. The viewing angle magnification liquid crystal display according to claim 1, wherein the viewing angle magnifying layer is a diffusion plate having substantially neither backscattering nor polarization cancellation.

11. The viewing angle magnification liquid crystal display according to claim 1,
wherein all layers are laminated using a transparent adhesive agent or pressure-sensitive adhesive agent.

12. A viewing angle magnification liciuid crystal display comprising at least:
a backlight system containing a polarization element (A) wherein said polarization element (A) comprises a retardation layer (b) and a reflection polarizer (a), wherein said reflection polarizer (a) comprises at least two layers and said retardation layer (b) is disposed between said at least two layers, and said reflection polarizer (a) has respective selective reflection wavelength bands of polarized light superimposed on each other to conduct collimation for a diffusion light source;
a liquid crystal cell transmitting collimated lights;
polarizing plates disposed on both sides of the liquid crystal cell; and
a viewing angle magnifying layer disposed on the viewer side of the liquid crystal cell to diffuse transmitted light, wherein
the reflection polarizer (a) is a linear polarization type reflection polarizer (a2) transmitting one of linearly polarized lights perpendicular to each other, but selectively reflecting the other thereof,
the retardation layer (b) comprises a layer (b1) having a front retardation of almost zero and a retardation of $\lambda/4$ or more relative to incident light incoming at a direction inclined from the normal direction by 30° or more,
layers (b2) each having a front retardation of about $\lambda/4$ disposed on both sides of the layer (b1), one of the layers (b2) being disposed between the retardation layer (b1) and a corresponding linear polarization type reflection polarizer (a2) and the other of the layers (b2) being disposed between the retardation layer (b1) and another linear polarization type reflection polarizer (a2),
the layer (b2) on the incidence side is arranged at an angle of 45°±5° or an angle of −45°±5° relative to the polarization axis of the linear polarization type reflection polarizer (a2) on the incidence side,
the layer (b2) on the emission side is arranged at an angle of −45°±5° or an angle of 45°±5° relative to the polarization axis of the linear polarization type reflection polarizer (a2) on the emission side, and
the layer (b2) on the incidence side and the layer (b2) on the emission side are arranged at an arbitrary angle formed between the slow axis of the layer (b2) on the incidence side and the slow axis of the layer (b2) on the emission side.

13. The viewing angle magnification liquid crystal display according to claim 12, wherein
the linear polarization type reflection polarizer (a2) is a stretched resin laminate with multiple layers comprising resin materials having respective different refractive indexes and retardation.

14. The viewing angle magnification liquid crystal display according to claim 12, wherein
an axis direction of a linearly polarized light obtained by transmission of the linear polarization type reflection polarizer (a2) and a transmission axis direction of a polarizing plate on the lower surface side of the liquid crystal display are disposed in alignment with each other.

15. The viewing angle magnification liquid crystal display according to claim 12, wherein
the selective reflection wavelengths of the at least two layers of the reflection polarizer (a) are superimposed on each other in the wavelength range of 550 nm±10 nm.

16. The viewing angle magnification liquid crystal display according to claim 12, wherein
the viewing angle magnifying layer is a diffusion plate having substantially neither backscattering nor polarization cancellation.

17. The viewing angle magnification liquid crystal display according to claim 12,
wherein all layers are laminated using a transparent adhesive agent or pressure-sensitive adhesive agent.

18. A viewing angle magnification liquid crystal display comprising at least:
a backlight system containing a polarization element (A) wherein said polarization element (A) comprises a retardation layer (b) and a reflection polarizer (a), wherein said reflection polarizer (a) comprises at least two layers and said retardation layer (b) is disposed between said at least two layers, and said reflection polarizer (a) has respective selective reflection wavelength bands of polarized light superimposed on each other to conduct collimation for a diffusion light source;
a liquid crystal cell transmitting collimated lights;
polarizing plates disposed on both sides of the liquid crystal cell; and
a viewing angle magnifying layer disposed on the viewer side of the liquid crystal cell to diffuse transmitted light, wherein
the reflection polarizer (a) is a linear polarization type reflection polarizer (a2) transmitting one of linearly polarized lights perpendicular to each other, but selectively reflecting the other thereof,
the retardation layer (b) comprises two biaxial retardation layers (b3) each having a front retardation of about $\lambda/4$ and an Nz factor of 2 or more,
the slow axis direction of the layer (b3) on the incidence side is arranged at an angle of 45°±5° or an angle of −45°±5° relative to the polarization axis of the linear polarization type reflection polarizer (a2) on the incidence side,
the slow axis direction of the layer (b3) on the emission side is arranged at an angle of −45°±5° or an angle of 45°±5° relative to the polarization axis of the linear polarization type reflection polarizer (a2) on the emission side, and
the layer (b3) on the incidence side and the layer (b3) on the emission side are arranged at an arbitrary angle formed between the slow axis of the layer (b3) on the incidence side and the slow axis of the layer (b3) on the emission side.

19. The viewing angle magnification liquid crystal display according to claim 18, wherein
the selective reflection wavelengths of the at least two layers of the reflection polarizer (a) are superimposed on each other in the wavelength range of 550 nm±10 nm.

20. The viewing angle magnification liquid crystal displace according to claim 18 wherein the linear polarization type reflection polarizer (a2) is a stretched resin laminate with multiple layers comprising resin materials having respective different refractive indexes and retardation.

21. The viewing angle magnification liquid crystal display according to claim 18, wherein an axis direction of a linearly polarized light obtained by transmission of the linear polarization type reflection polarizer (a2) and a transmission axis direction of a polarizing plate on the lower surface side of the liquid crystal display are disposed in alignment with each other.

22. The viewing angle magnification liquid crystal display according to claim 18, wherein the viewing angle magnifying layer is a diffusion plate having substantially neither backscattering nor polarization cancellation.

23. The viewing angle magnification liquid crystal display according to claim 18, wherein all layers are laminated using a transparent adhesive agent or pressure-sensitive adhesive agent.

24. A viewing angle magnification liquid crystal display comprising at least:

a backlight system containing a polarization element (A) wherein said polarization element (A) comprises a retardation layer (b) and a reflection polarizer (a), wherein said reflection polarizer (a) comprises at least two layers and said retardation layer (b) is disposed between said at least two layers, and said reflection polarizer (a) has respective selective reflection wavelength bands of polarized light superimposed on each other to conduct collimation for a diffusion light source;

a liquid crystal cell transmitting collimated lights;

polarizing plates disposed on both sides of the liquid crystal cell; and a viewing angle magnifying layer disposed on the viewer side of the liquid crystal cell to diffuse transmitted light, wherein the reflection polarizer (a) is a linear polarization type reflection polarizers (a2) transmitting one of linearly polarized lights perpendicular to each other, but selectively reflecting the other thereof, the retardation layer (b) comprises one biaxial retardation layer (b4) having a front retardation of about $\lambda/2$ and an Nz factor of 1.5 or more, the slow axis direction of the retardation layer (b4) on the incidence side is arranged at an an angle of $45°\pm5°$ or an angle of $-45°\pm5°$ relative to the polarization axis of the linear polarization type reflection polarizer (a2) on the incidence side, the slow axis direction of the retardation layer (b4) on the emission side is arranged at an angle of $-45°\pm5°$ or an angle of $45°\pm5°$ relative to the polarization axis of the linear polarization type reflection polarizer (a2) on the emission side, and the polarization axes of the two linear polarization type reflection polarizers (a2) are almost perpendicular to each other.

25. The viewing angle magnification liquid crystal display according to claim 24, wherein the selective reflection wavelengths of the at least two layers of the reflection polarizer (a) are superimposed on each other in the wavelength range of 550 nm±10 nm.

26. The viewing angle magnification liquid crystal display according to claim 24, wherein the linear polarization type reflection polarizer (a2) is a stretched resin laminate with multiple layers comprising resin materials having respective different refractive indexes and retardation.

27. The viewing angle magnification liquid crystal display according to claim 24, wherein an axis direction of a linearly polarized light obtained by transmission of the linear polarization type reflection polarizer (a2) and a transmission axis direction of a polarizing plate on the lower surface side of the liquid crystal display are disposed in alignment with each other.

28. The viewing angle magnification liquid crystal display according to claim 24, wherein the viewing angle magnifing layer is a diffusion plate having substantially neither backscattering nor polarization cancellation.

29. The viewing angle magnification liquid crystal display according to claim 24, wherein all layers are laminated using a transparent adhesive agent or pressure-sensitive adhesive agent.

* * * * *